US012584011B2

(12) United States Patent
Kobayashi et al.

(10) Patent No.: US 12,584,011 B2
(45) Date of Patent: Mar. 24, 2026

(54) EPOXY RESIN COMPOSITION, GAS BARRIER LAMINATE, AND PACKAGING MATERIAL

(71) Applicant: MITSUBISHI GAS CHEMICAL COMPANY, INC., Tokyo (JP)

(72) Inventors: Naoko Kobayashi, Kanagawa (JP); Kazuki Kouno, Kanagawa (JP); Ryoma Hashimoto, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 350 days.

(21) Appl. No.: 18/036,944

(22) PCT Filed: Oct. 6, 2021

(86) PCT No.: PCT/JP2021/036946
§ 371 (c)(1),
(2) Date: May 15, 2023

(87) PCT Pub. No.: WO2022/107473
PCT Pub. Date: May 27, 2022

(65) Prior Publication Data

US 2023/0416520 A1 Dec. 28, 2023

(30) Foreign Application Priority Data

Nov. 18, 2020 (JP) ................................ 2020-191921

(51) Int. Cl.
*C08L 63/00* (2006.01)
*C08K 5/17* (2006.01)
*C08K 5/20* (2006.01)
*C08K 5/544* (2006.01)

(52) U.S. Cl.
CPC ................ *C08L 63/00* (2013.01); *C08K 5/17* (2013.01); *C08K 5/20* (2013.01); *C08K 5/544* (2013.01); *C08L 2201/14* (2013.01)

(58) Field of Classification Search
CPC ....... C08L 63/00; C08L 2201/14; C08K 5/17; C08K 5/20; C08K 5/544
See application file for complete search history.

(56) References Cited

U.S. PATENT DOCUMENTS

| | | | | |
|---|---|---|---|---|
| 2015/0059295 A1* | 3/2015 | Honda | .................. | C08G 59/44 53/473 |
| 2017/0121520 A1 | 5/2017 | Tan et al. | | |
| 2019/0284389 A1 | 9/2019 | Suematsu et al. | | |
| 2020/0071515 A1 | 3/2020 | Kouno | | |
| 2022/0010054 A1 | 1/2022 | Hanaoka | | |
| 2023/0059584 A1 | 2/2023 | Kouno et al. | | |

FOREIGN PATENT DOCUMENTS

| | | | | |
|---|---|---|---|---|
| CN | 111777922 A | 10/2020 | | |
| JP | 60-163916 A | 8/1985 | | |
| JP | 9-176292 A | 7/1997 | | |
| JP | 2003-300271 A | 10/2003 | | |
| JP | 2005-28835 A | 2/2005 | | |
| JP | 2006-328365 A | 12/2006 | | |
| JP | 2009-101684 A | 5/2009 | | |
| JP | 2010-202753 A | 9/2010 | | |
| JP | 2013-203023 A | 10/2013 | | |
| JP | 2017-528530 A | 9/2017 | | |
| JP | 2019-006972 A | 1/2019 | | |
| JP | 2020084054 A * | 6/2020 | | |
| WO | 2018/105282 A1 | 6/2018 | | |
| WO | 2018/159566 | 9/2018 | | |
| WO | WO-2019087986 A1 * | 5/2019 | ............. | H01L 23/29 |
| WO | 2020/110601 | 6/2020 | | |
| WO | 2021/157376 A1 | 8/2021 | | |

OTHER PUBLICATIONS

Machine Translation of Igarashi (JP 2020084054 A) (Year: 2020).*
Machine Translation of Hori (WO 2019087986 A1) (Year: 2019).*
Machine Translation of Shibamoto (WO 2013099693 A1) (Year: 2013).*
International Search Report in International Bureau of WIPO Patent Application No. PCT/JP2021/036946, dated Dec. 21, 2021, along with an English translation thereof.
Written Opinion in International Bureau of WIPO Patent Application No. PCT/JP2021/036946, dated Dec. 21, 2021, along with an English translation thereof.

* cited by examiner

*Primary Examiner* — Callie E Shosho
*Assistant Examiner* — Bethany M Miller
(74) *Attorney, Agent, or Firm* — GREENBLUM & BERNSTEIN, P.L.C.

(57) ABSTRACT

An epoxy resin composition containing an epoxy resin, an epoxy resin curing agent containing an amine-based curing agent, and a polyalkylene glycol, as well as a gas barrier laminate and a packaging material in which the epoxy resin composition is used.

10 Claims, 9 Drawing Sheets

EPOXY RESIN COMPOSITION, GAS BARRIER LAMINATE, AND PACKAGING MATERIAL

TECHNICAL FIELD

The present invention relates to an epoxy resin composition, as well as a gas barrier laminate and a packaging material in which the epoxy resin composition is used.

BACKGROUND ART

Packaging materials used for food products, pharmaceuticals, cosmetics, precision electronic components, and the like require high oxygen barrier properties and water vapor barrier properties to prevent deterioration of the contents.

Oxygen barrier performance of thermoplastic plastic films is typically not so high, and thus means for imparting gas barrier properties to the films have been studied, including a method for forming a gas barrier layer of various types, such as a polyvinylidene chloride (PVDC) layer or a polyvinyl alcohol (PVA) layer, and a method for vapor-depositing an inorganic substance, such as alumina ($Al_2O_3$) or silica ($SiO_2$).

Films having a PVDC layer formed as a gas barrier layer are transparent and exhibit good barrier properties. However, when incinerated as general wastes, those films may generate hazardous substances, such as acid gases, and thus a transition to other materials is desired due to environmental concerns. Films in which a PVA layer is formed exhibit excellent gas barrier properties under low humidity but are highly hygroscopic, causing a problem in that the gas barrier properties rapidly decreases at a relative humidity of approximately 70% or higher.

An inorganic vapor-deposited film, which is a thermoplastic plastic film on which an inorganic substance, such as alumina or silica, is vapor-deposited, is transparent and has good gas barrier properties, and does not cause such problems described above. However, in bending the inorganic vapor-deposited film, cracks are generated in the vapor-deposited inorganic layer, causing a problem of significant reduction of the gas barrier properties.

As a method for improving the bending resistance of the gas barrier film or laminate including a layer on which an inorganic substance is vapor-deposited, a method for forming a layer made from a cured product of an epoxy resin composition containing a predetermined epoxy resin and a predetermined amine-based epoxy resin curing agent as a main component has been proposed (Patent Documents 1 to 3).

Furthermore, Patent Document 4 discloses a gas barrier film having a certain layer configuration that includes a substrate film having vapor-deposited inorganic layer and a cured resin layer, the cured resin layer including a cured product of an epoxy resin composition containing an epoxy resin, a certain epoxy resin curing agent, and non-spherical inorganic particles. This gas barrier film exhibits improved gas barrier properties and has bending resistance better than known gas barrier films having a vapor-deposited inorganic layer.

Improving epoxy resin compositions for use in gas barrier films are investigated to enhance the various functions of the gas barrier films to be obtained. For example, Patent Document 5 discloses a gas barrier resin composition containing an epoxy resin, an epoxy resin curing agent, and a specific curing accelerator, and also containing a prescribed amount of a predetermined amine-derived skeletal structure in a cured product that is to be formed, and indicates that the gas barrier resin composition exhibits high gas barrier properties in a wide range of curing conditions.

As described above, forming a gas barrier layer including a cured product of a certain epoxy resin composition on a substrate is known to have a great improvement effect on the gas barrier properties.

Furthermore, in a gas barrier film having a laminated structure, or a gas barrier laminate, it is important that interlayer adhesiveness should be high to achieve good gas barrier properties stably. In this regard, for example, Patent Document 6 describes that in a laminate film obtained by laminating at least a substrate, a primer layer, an adhesive layer, and a sealant layer in this order, using a primer composition containing a specific polyester resin to form the primer layer, and using an adhesive containing an epoxy resin composition as a main component to form the adhesive layer enable to produce a laminate film that excels in adhesiveness over time and maintains excellent laminate strength and heat seal strength even when stored for a long period of time.

CITATION LIST

Patent Document

Patent Document 1: JP 2003-300271 A
Patent Document 2: JP 2005-028835 A
Patent Document 3: JP 2009-101684 A
Patent Document 4: WO 2018/105282
Patent Document 5: JP 2010-202753 A
Patent Document 6: JP 2013-203023 A

SUMMARY OF INVENTION

Technical Problem

However, depending on the type of substrate and epoxy resin composition used in the gas barrier film or laminate, the interlayer adhesiveness between the substrate and the cured product layer of the epoxy resin composition is not sufficient. Patent Documents 1 to 6 each disclose an epoxy resin composition in which an amine-based epoxy resin curing agent is used, but according to research by the present inventors in recent years, it has been discovered that the cured product of an epoxy resin composition in which an amine-based epoxy resin curing agent is used has an unstable adhesiveness to inorganic substances.

Further, when the epoxy resin composition is used as an intermediate layer of a gas barrier laminate, the epoxy resin composition may have the performance as an adhesive in addition to gas barrier properties. Meanwhile, when the epoxy resin composition is used as a surface layer (the innermost layer or outermost layer) of a gas barrier laminate, the performance suitable for a coating composition is important. For example, characteristics such as rapid drying, less sticking after coating (blocking), good appearance of the formed coating film, and the like are desirable.

In general, addition of a lubricant or the like is effective for the suppression of blocking. However, a cured product of an epoxy resin composition containing an additive tends to have an inferior gas barrier property compared to that of a cured product of an epoxy resin composition containing no additive. In addition, a curing coating film produced by applying the epoxy resin composition containing an additive to a substrate or the like may have a poor appearance, such as uneven coating or decreased gloss.

An object of the present invention is to provide an epoxy resin composition that can form a curing coating film having high gas barrier properties, practically sufficient adhesiveness, and a good appearance, and to provide a gas barrier laminate and a packaging material in which the epoxy resin composition is used.

Solution to Problem

The present inventors have discovered that the above problem can be solved by an epoxy resin composition containing an epoxy resin, an epoxy resin curing agent containing an amine-based curing agent, and a polyalkylene glycol.

That is, the present invention relates to the following aspects [1] to [3].

[1] An epoxy resin composition containing an epoxy resin, an epoxy resin curing agent containing an amine-based curing agent, and a polyalkylene glycol.

[2] A gas barrier laminate including a substrate and a cured product layer of the epoxy resin composition according to [1].

[3] A packaging material containing the gas barrier laminate according to [2].

Advantageous Effects of Invention

The epoxy resin composition of the present invention can form a curing coating film that is particularly useful as a coating composition, and that has high gas barrier properties, practically sufficient adhesiveness, and a good appearance. The gas barrier laminate including a substrate and a cured product layer of the epoxy resin composition is suitable to be used as various packaging materials.

DESCRIPTION OF EMBODIMENTS

Epoxy Resin Composition

Figure 1:
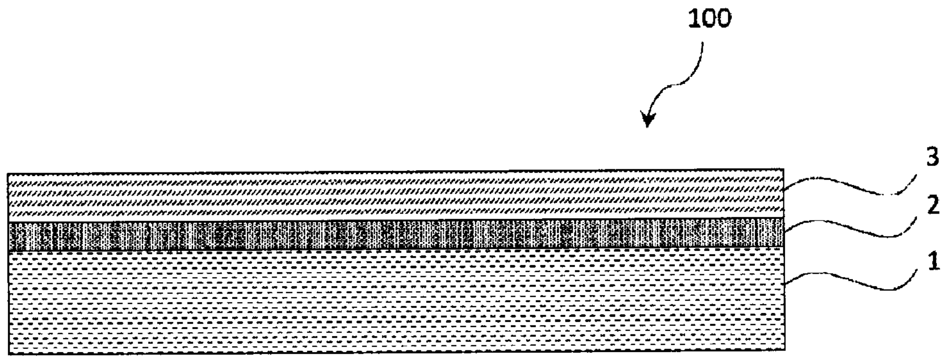
FIG. 1 is a schematic cross-sectional view illustrating a gas barrier laminate 100 according to an embodiment of the present invention.

The epoxy resin composition according to an embodiment of the present invention is an epoxy resin composition containing an epoxy resin, an epoxy resin curing agent containing an amine-based curing agent, and a polyalkylene glycol.

By having the above configuration, the epoxy resin composition according to an embodiment of the present invention can form a curing coating film having high gas barrier properties, practically sufficient adhesiveness, and a good appearance. The reason for this is not clear but is assumed to be the leveling action of the polyalkylene glycol.

From the viewpoints of improving the drying speed, facilitating the application to a substrate having a low thermal resistance, and suppressing blocking and imparting properties suitable for a coating composition, and from the viewpoint of improving the adhesiveness of a curing coating film to an inorganic substance, the epoxy resin composition according to an embodiment of the present invention preferably further contains an unsaturated fatty acid amide having from 14 to 24 carbons.

When the epoxy resin composition contains an unsaturated fatty acid amide having from 14 to 24 carbons, it is thought that the unsaturated fatty acid amide having from 14 to 24 carbons functions as a lubricant and contributes to the improvement of drying speed and the suppression of blocking. It is also believed that an unsaturated fatty acid amide having from 14 to 24 carbons acts to relieve the stress generated in the epoxy resin cured product; also, compared to, for example, a saturated fatty acid amide, an unsaturated fatty acid amide having from 14 to 24 carbons has higher compatibility with an epoxy resin composition containing an amine-based epoxy resin curing agent. Therefore, it is inferred that a cured product of an epoxy resin composition containing the unsaturated fatty acid amide has good adhesiveness to an inorganic substance.

Each component contained in the epoxy resin composition according to an embodiment of the present invention will be described.

Epoxy Resin

The epoxy resin used in the epoxy resin composition according to an embodiment of the present invention may be a saturated or unsaturated aliphatic compound or alicyclic compound, an aromatic compound, or a heterocyclic compound, but in consideration of the manifestation of high gas barrier properties, an epoxy resin containing an aromatic ring or an alicyclic structure in the molecule is preferable.

Specific examples of the epoxy resin include at least one resin selected from epoxy resins having a glycidylamino group derived from meta-xylylenediamine, epoxy resins having a glycidylamino group derived from para-xylylenediamine, epoxy resins having a glycidylamino group derived from 1,3-bis(aminomethyl) cyclohexane, epoxy resins having a glycidylamino group derived from 1,4-bis(aminomethyl) cyclohexane, epoxy resins having a glycidylamino group derived from diaminodiphenylmethane, epoxy resins having a glycidylamino group and/or a glycidyloxy group derived from a para-aminophenol, epoxy resins having a glycidyloxy group derived from bisphenol A, epoxy resins having a glycidyloxy group derived from bisphenol F, epoxy resins having a glycidyloxy group derived from a phenol novolac, and epoxy resins having a glycidyloxy group derived from resorcinol. In order to improve various performance aspects such as flexibility, impact resistance, and moist heat resistance, two or more types of the epoxy resins described above may be mixed at appropriate ratios and used.

Of the abovementioned epoxy resins, from the viewpoint of gas barrier properties, the epoxy resin is preferably one having, as a main component, at least one component selected from the group consisting of an epoxy resin having a glycidylamino group derived from meta-xylylenediamine, an epoxy resin having a glycidylamino group derived from para-xylylenediamine, and an epoxy resin having a glycidyloxy group derived from bisphenol F, and is more preferably one having, as a main component, an epoxy resin having a glycidylamino group derived from meta-xylylenediamine.

Note that "main component" here means that other components may be included within a range that does not depart from the spirit of the present invention, and also means a component that is included in an amount of preferably from 50 to 100 mass %, more preferably from 70 to 100 mass %, and even more preferably from 90 to 100 mass % relative to the total amount.

Epoxy Resin Curing Agent Containing Amine-Based Curing Agent

The epoxy resin curing agent used in the epoxy resin composition according to an embodiment of the present invention contains an amine-based curing agent from the viewpoint of achieving high gas barrier properties.

As the amine-based curing agent, a polyamine or a modified product thereof conventionally used as an epoxy resin curing agent can be used. From the viewpoint of achieving high gas barrier properties, the amine-based curing agent is preferably a polyamine modified product, more preferably at least one selected from the group consisting of amine-based curing agents (i) and amine-based curing agents (ii) described below, and even more preferably an amine-based curing agent (i):

(i) a reaction product of a component (A) and a component (B) below:

(A) at least one type selected from the group consisting of meta-xylylenediamine and para-xylylenediamine, and (B) at least one type selected from the group consisting of unsaturated carboxylic acids represented by Formula (1) below and derivatives thereof;

(1)

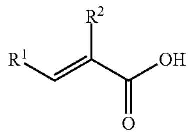

where, in Formula (1), $R^1$ and $R^2$ each independently represent a hydrogen atom, an alkyl group having from 1 to 8 carbons, an aryl group having from 6 to 12 carbons, or an aralkyl group having from 7 to 13 carbons;

(ii) A reaction product between epichlorohydrin and at least one selected from the group consisting of meta-xylylenediamine and para-xylylenediamine.

Amine-Based Curing Agent (i)

The amine-based curing agent (i) is a reaction product between the component (A) and the component (B) below:

(A) at least one type selected from the group consisting of meta-xylylenediamine and para-xylylenediamine;

(B) at least one type selected from the group consisting of unsaturated carboxylic acids represented by Formula (1) below and derivatives thereof, (1)

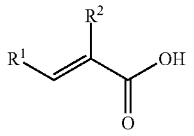

where, in Formula (1), $R^1$ and $R^2$ each independently represent a hydrogen atom, an alkyl group having from 1 to 8 carbons, an aryl group having from 6 to 12 carbons, or an aralkyl group having from 7 to 13 carbons.

The component (A) is used from the viewpoint of gas barrier properties, and meta-xylylenediamine is preferable considering gas barrier properties. One type of component (A) may be used alone, or two types of the components (A) may be mixed and used.

The component (B) is at least one selected from the group consisting of unsaturated carboxylic acids represented by Formula (1) and derivatives thereof, and from the viewpoint of gas-barrier properties, in Formula (1), $R^1$ is preferably a hydrogen atom or an alkyl group having from 1 to 8 carbons, more preferably a hydrogen atom or an alkyl group having from 1 to 3 carbons, even more preferably a hydrogen atom or a methyl group, and yet even more preferably a hydrogen atom.

Moreover, from the viewpoint of gas barrier properties, in Formula (1), $R^2$ is preferably a hydrogen atom or an alkyl group having from 1 to 8 carbons, more preferably a hydrogen atom or an alkyl group having from 1 to 3 carbons, even more preferably a hydrogen atom or a methyl group, and yet even more preferably a hydrogen atom.

Examples of the derivatives of the unsaturated carboxylic acids represented by Formula (1) include esters, amides, acid anhydrides, and acid chlorides of the unsaturated carboxylic acids. The ester of the unsaturated carboxylic acid is preferably an alkyl ester, and in terms of achieving good reactivity, the alkyl has preferably from 1 to 6 carbons, more preferably from 1 to 3 carbons, and even more preferably from 1 to 2 carbons.

Examples of the unsaturated carboxylic acids represented by Formula (1) above and the derivatives of the unsaturated carboxylic acids include unsaturated carboxylic acids, such as acrylic acid, methacrylic acid, α-ethylacrylic acid, α-propylacrylic acid, α-isopropylacrylic acid, α-n-butylacrylic acid, α-t-butylacrylic acid, α-pentylacrylic acid, α-phenylacrylic acid, α-benzylacrylic acid, crotonic acid, 2-pentenoic acid, 2-hexenoic acid, 4-methyl-2-pentenoic acid, 2-heptenoic acid, 4-methyl-2-hexenoic acid, 5-methyl-2-hexenoic acid, 4,4-dimethyl-2-pentenoic acid, 4-phenyl-2-butenoic acid, cinnamic acid, o-methyl cinnamic acid, m-methyl cinnamic acid, p-methyl cinnamic acid, and 2-octenoic acid; and esters, amides, acid anhydrides, and acid chlorides of these unsaturated carboxylic acids.

Among the above, from the viewpoint of achieving good gas barrier properties, the component (B) is preferably at least one selected from the group consisting of acrylic acid, methacrylic acid, crotonic acid, and derivatives of these acids, and more preferably at least one selected from the group consisting of acrylic acid, methacrylic acid, crotonic acid, and alkyl esters of these acids, even more preferably at least one selected from the group consisting of acrylic acid, methacrylic acid, and alkyl esters of these acids, still more preferably alkyl esters of acrylic acid, and still even more preferably methyl acrylate.

One type of component (B) may be used alone, or two or more types in combination may be used.

When an unsaturated carboxylic acid, an ester, or an amide is used as the component (B), the reaction between the component (A) and the component (B) is carried out by mixing the component (A) and the component (B) under a temperature condition of from 0 to 100° C. and more preferably from 0 to 70° C., and then carrying out, at a temperature condition of from 100 to 300° C. and preferably from 130 to 250° C., a Michael addition reaction and an amide group formation reaction by dehydration, de-alcoholization, and deamination.

In this case, in the amide group formation reaction, to complete the reaction, the pressure inside a reaction device can be reduced at the final stage of the reaction as necessary. In addition, a non-reactive solvent can be used to dilute as necessary. Furthermore, a catalyst, such as a phosphite ester, can be added as a dehydrating agent or a dealcoholizing agent.

On the other hand, when an acid anhydride or an acid chloride of an unsaturated carboxylic acid is used as the component (B), the reaction is performed by mixing the component (A) and the component (B) under conditions of 0 to 150° C. and preferably 0 to 100° C., and then performing a Michael addition reaction and the amide group formation reaction. In this case, in the amide group formation reaction, to complete the reaction, the pressure inside a reaction device can be reduced at the final stage of the reaction as necessary. In addition, a non-reactive solvent can be used to dilute as necessary. Furthermore, a tertiary amine, such as pyridine, picoline, lutidine, or trialkylamine, can be added.

The amide group moiety formed by the reaction between the component (A) and the component (B) has high cohesive force, and thus the cured product layer formed using the epoxy resin curing agent that is the reaction product produced from the reaction between the component (A) and the component (B) exhibits high gas barrier properties and good adhesiveness.

The reaction molar ratio of the component (B) to the component (A), [(B)/(A)], is preferably in a range of 0.3 to 1.0. When the reaction molar ratio is 0.3 or greater, a sufficient amount of the amide groups is produced in the epoxy resin curing agent, and high levels of gas barrier properties and adhesiveness are exhibited. On the other hand, when the reaction molar ratio is in a range of 1.0 or less, the amount of amino groups necessary for reaction with the epoxy groups in the epoxy resin is sufficient, and excellent heat resistance and excellent solubility in organic solvents and water are exhibited.

When consideration is given particularly to the high gas barrier properties and excellent coating film performance of the epoxy resin cured product that is to be produced, the reaction molar ratio [(B)/(A)] of the component (B) to the component (A) is more preferably in a range of from 0.6 to 1.0.

The amine-based curing agent may be a reaction product of only the components (A) and (B), or may be a reaction product of the components (A) and (B), and at least one compound selected from the group consisting of the following components (C), (D) and (E).

(C) At least one component selected from the group consisting of monovalent carboxylic acids represented by $R^3$—COOH and derivatives thereof (where $R^3$ represents a hydrogen atom, an alkyl group having from 1 to 7 carbons and which may have a hydroxyl group, or an aryl group having from 6 to 12 carbons)

(D) A cyclic carbonate (E) A mono-epoxy compound having from 2 to 20 carbons

The component (C), which is a monovalent carboxylic acid represented by $R^3$—COOH or a derivative thereof, is used as necessary from the viewpoints of reducing the reactivity between the epoxy resin curing agent and the epoxy resin and improving workability.

$R^3$ represents a hydrogen atom, an alkyl group having from 1 to 7 carbons and which may have a hydroxyl group, or an aryl group having from 6 to 12 carbons, and $R^3$ is preferably an alkyl group having from 1 to 3 carbons or a phenyl group.

Examples of derivatives of the monovalent carboxylic acid represented by $R^3$—COOH include esters, amides, acid anhydrides, and acid chlorides of the carboxylic acid. The ester of the carboxylic acid is preferably an alkyl ester, and the number of carbons of the alkyl is preferably from 1 to 6, more preferably from 1 to 3, and even more preferably 1 or 2.

Examples of the component (C) include monovalent carboxylic acids such as formic acid, acetic acid, propionic acid, butyric acid, lactic acid, glycolic acid, and benzoic acid, and derivatives thereof.

For the component (C), one type may be used alone, or two or more types may be used in combination.

The cyclic carbonate of the component (D) is used as necessary, from the viewpoints of reducing the reactivity between the epoxy resin curing agent and the epoxy resin and improving workability, and is preferably a cyclic carbonate of a six-membered ring or less from the viewpoint of reactivity with the component (A). Examples include ethylene carbonate, propylene carbonate, glycerin carbonate, 1,2-butylene carbonate, vinylene carbonate, 4-vinyl-1,3-dioxolan-2-one, 4-methoxymethyl-1,3-dioxolan-2-one, and 1,3-dioxan-2-one. Among these, from the viewpoint of gas barrier properties, at least one selected from the group consisting of ethylene carbonate, propylene carbonate, and glycerin carbonate is preferable.

For the component (D), one type may be used alone, or two or more types may be used in combination.

The mono-epoxy compound, which is the component (E), is a mono-epoxy compound having from 2 to 20 carbons, and is used as necessary, from the viewpoints of reducing the reactivity between the epoxy resin curing agent and the epoxy resin and improving workability. From the viewpoint of gas barrier properties, the component (E) is preferably a mono-epoxy compound having from 2 to 10 carbons and is more preferably a compound represented by the following Formula (2):

(2)

where in Formula (2), $R^4$ represents a hydrogen atom, an alkyl group having from 1 to 8 carbons, an aryl group, or $R^5$—O—$CH_2$—, and $R^5$ represents a phenyl group or a benzyl group.

Examples of the mono-epoxy compound represented by Formula (2) include ethylene oxide, propylene oxide, 1,2-butylene oxide, styrene oxide, phenylglycidyl ether, and benzylglycidyl ether. For the component (E), one type may be used alone, or two or more types may be used in combination.

For a case in which the component (C), (D), or (E) is used in the amine-based curing agent, any one type of a compound selected from the group consisting of the components (C), (D), and (E) may be used alone, or a combination of two or more types may be used.

Note that the amine-based curing agent may be a reaction product that is formed by reacting, in addition to the components (A) to (E), another component within a scope that does not hinder the effect of the present invention. Examples of the other component referred to here include aromatic dicarboxylic acids or derivatives thereof.

However, the usage amount of the "other component" is preferably 30 mass % or less, more preferably 10 mass % or less, and even more preferably 5 mass % or less of the total amount of the reaction components constituting the amine-based curing agent.

The reaction product of the components (A) and (B) and the at least one compound selected from the group consisting of the components (C), (D), and (E) is produced by using at least one compound selected from the group consisting of the components (C), (D), and (E) in combination with the component (B) and reacting this combination with the component (A), which is a polyamine compound. The reaction may be performed by adding the components (B) to (E) in any order and reacting with the component (A), or by mixing the components (B) to (E) and then reacting the mixture with the component (A).

The reaction between the component (A) and the component (C) can be carried out under the same conditions as those of the reaction between the component (A) and the component (B). In a case where the component (C) is used, the components (B) and (C) may be mixed and then reacted with the component (A), or the components (A) and (B) may be first reacted and then further reacted with the component (C).

On the other hand, in a case in which the component (D) and/or the component (E) is used, preferably, the components (A) and (B) are first reacted, and then further reacted with the component (D) and/or the component (E).

The reaction between the component (A) and the component (D) and/or the component (E) is carried out by mixing the component (A) and the component (D) and/or the component (E) at a temperature of from 25 to 200° C., and then implementing an addition reaction at a temperature of from 30 to 180° C. and preferably from 40 to 170° C. Furthermore, as necessary, a catalyst such as sodium methoxide, sodium ethoxide, and potassium t-butoxide can be used.

When the reaction is to be carried out, as necessary, the component (D) and/or the component (E) may be melted or diluted with a non-reactive solvent and used in order to facilitate the reaction.

Even for a case in which the amine-based curing agent is a reaction product of the components (A) and (B), and at least one compound selected from the group consisting of the components (C), (D), and (E), the reaction molar ratio [(B)/(A)] of the component (B) to the component (A) is, for the same reason as described above, preferably in a range from 0.3 to 1.0, and more preferably in a range from 0.6 to 1.0. Meanwhile, the reaction molar ratio [{(C)+(D)+(E)}/(A)] of the components (C), (D), and (E) to the component (A) is preferably in a range from 0.05 to 3.1, more preferably in a range from 0.07 to 2.5, and even more preferably in a range from 0.1 to 2.0.

However, from the viewpoints of the gas barrier properties and coating performance, the reaction molar ratio [{(B)+(C)+(D)+(E)}/(A)] of the components (B) to (E) to the component (A) is preferably in a range of from 0.35 to 2.5, more preferably in a range of from 0.35 to 2.0.

Amine-Based Curing Agent (ii)

The amine-based curing agent (ii) is a reaction product between epichlorohydrin and at least one selected from the group consisting of meta-xylylenediamine and para-xylylenediamine The amine-based curing agent (ii) preferably contains a compound represented by Formula (3) below as a main component. Here, "main component" refers to a component having a content of 50 mass % or greater when the total constituent components in the amine-based curing agent (ii) is 100 mass %.

$$H_2N\!-\!\left[CH_2-A-CH_2-NHCH_2\underset{\displaystyle OH}{\underset{|}{C}}HCH_2NH\right]_n\!-CH_2-A-CH_2-NH_2 \qquad (3)$$

where in Formula (3), A represent a 1,3-phenylene group or a 1,4-phenylene group, and n is a number of 1 to 12. A is more preferably a 1,3-phenylene group.

The content of the compound represented by Formula (3) above in the amine-based curing agent (ii) is preferably 60 mass % or greater, more preferably 70 mass % or greater, even more preferably 75 mass % or greater, and yet even more preferably 85 mass % or greater. Furthermore, the upper limit is 100 mass %.

From the viewpoint of achieving excellent curing performance as a curing agent, it is preferable that the proportion of a compound with n=1 among the compounds represented by Formula (3) above is large. The content of the compound represented by Formula (3) above with n=1 in the amine-based curing agent (ii) is preferably 15 mass % or greater, more preferably 20 mass % or greater, and even more preferably 25 mass % or greater. Furthermore, the upper limit is 100 mass %.

The content of the compound represented by Formula (3) above in the amine-based curing agent (ii) and the composition of the compound represented by Formula (3) above can be determined by GC analysis and gel permeation chromatography (GPC) analysis.

The amine-based curing agent (ii) can be formed by subjecting epichlorohydrin and at least one selected from the group consisting of meta-xylylenediamine and para-xylylenediamine to a ring-opening addition reaction and a condensation reaction by a common method.

The epoxy resin curing agent used in an embodiment of the present invention may contain a curing agent component besides an amine-based curing agent, but from the viewpoint of achieving high gas barrier properties, the content of the amine-based curing agent is preferably large. From the viewpoint of achieving high gas barrier properties, the content of the amine-based curing agent in the epoxy resin curing agent is preferably at least 50 mass %, more preferably at least 70 mass %, even more preferably at least 80 mass %, and yet even more preferably at least 90 mass %. Furthermore, the upper limit is 100 mass %.

The epoxy resin curing agent used in an embodiment of the present invention may further contain a coupling agent from the viewpoint of improving adhesiveness. Examples of the coupling agent include a silane coupling agent, a titanate-based coupling agent, and an aluminate-based coupling agent. A silane coupling agent is preferable from the viewpoint of improving adhesiveness to an inorganic substance.

Examples of the silane coupling agent include a silane coupling agent having a vinyl group, a silane coupling agent having an amino group, a silane coupling agent having an epoxy group, a silane coupling agent having a (meth)acryl group, and a silane coupling agent having a mercapto group. Among these, from the viewpoint of improving adhesiveness, the silane coupling agent is preferably at least one selected from the group consisting of a silane coupling agent having an amino group and a silane coupling agent having an epoxy group.

When a coupling agent is used, the content of the coupling agent in the epoxy resin curing agent is preferably from 0.1 to 10 parts by mass, more preferably from 1 to 8 parts by mass, per 100 parts by mass of the curing agent component in the epoxy resin curing agent.

The compounding ratio of the epoxy resin and the epoxy resin curing agent in the epoxy resin composition may be within the standard compounding range that is ordinarily used for a case in which an epoxy resin reaction product is produced through a reaction between an epoxy resin and an epoxy resin curing agent. Specifically, the ratio of (number of active amine hydrogens in the epoxy resin curing agent)/(number of epoxy groups in the epoxy resin), which is the ratio of the number of active amine hydrogens in the epoxy resin curing agent to the number of epoxy groups in the epoxy resin is preferably in a range from 0.2 to 12.0. From the viewpoint of improving adhesiveness to an inorganic substance, the value of (number of active amine hydrogens in epoxy resin curing agent)/(number of epoxy groups in epoxy resin) is more preferably in a range of from 0.4 to 10.0, even more preferably from 0.6 to 8.0, yet even more preferably greater than 1.0 and 5.0 or less, and still more preferably from 1.1 to 3.5.

Polyalkylene Glycol

The epoxy resin composition according to an embodiment of the present invention contains a polyalkylene glycol. When a polyalkylene glycol is used, even with an epoxy resin composition containing an unsaturated fatty acid amide having from 14 to 24 carbons, it is possible to produce an epoxy resin composition that can form a curing coating film having suppressed deterioration of gas barrier properties and gloss, and thus having high gas barrier properties and practically sufficient adhesiveness, and a good appearance.

Examples of the polyalkylene glycol include a homopolymer or copolymer of an alkylene glycol having from 2 to 8 carbons. The alkylene glycol may be either a linear alkylene glycol or a branched alkylene glycol.

Specific examples of the homopolymer of an alkylene glycol having from 2 to 8 carbons include polyethylene glycol (PEG), polypropylene glycol (PPG), poly(oxytrimethylene) glycol [polytrimethylene ether glycol], poly(oxybutylene) glycol, poly(oxytetramethylene) glycol [polytetramethylene ether glycol: PTMG], poly(oxypentamethylene) glycol, poly(oxyhexamethylene) glycol, and poly(oxyoctamethylene) glycol.

Specific examples of the copolymer of an alkylene glycol having from 2 to 8 carbons include polyoxyethylene-polyoxypropylene glycol (PEG-PPG), polyoxyethylene-polyoxytrimethylene glycol, polyoxyethylene-polyoxybutylene glycol, polyoxyethylene-polyoxytetramethylene glycol (PEG-PTMG), polyoxyethylene-polyoxyhexamethylene glycol, polyoxypropylene-polyoxytrimethylene glycol, polyoxypropylene-polyoxybutylene glycol, polyoxypropylene-polyoxytetramethylene glycol (PPG-PTMG), polyoxytrimethylene-polyoxytetramethylene glycol, polyoxytetramethylene-polyoxyhexamethylene glycol, polyoxyethylene-polyoxypropylene-polyoxybutylene glycol, and polyoxyethylene-polyoxypropylene-polyoxytetramethylene glycol.

One type of the polyalkylene glycols can be used, or two or more types of the polyalkylene glycols can be used. From the viewpoint of improving gas barrier properties and the viewpoint of improving the appearance of the curing coating film, the polyalkylene glycol is preferably a homopolymer or a copolymer of an alkylene glycol having 2 to 6 carbons, more preferably a homopolymer or a copolymer of an alkylene glycol having from 2 to 4 carbons, even more preferably at least one selected from the group consisting of polyethylene glycol, polypropylene glycol, poly(oxytrimethylene) glycol, poly(oxybutylene) glycol, poly(oxytetramethylene) glycol, polyoxyethylene-polyoxypropylene glycol, polyoxyethylene-polyoxytrimethylene glycol, polyoxyethylene-polyoxytetramethylene glycol, polyoxypropylene-polyoxytetramethylene glycol, and polyoxytrimethylene-polyoxytetramethylene glycol, and yet even more preferably at least one selected from the group consisting of polyethylene glycol, polypropylene glycol, and poly(oxytetramethylene) glycol; from the viewpoint of improving gas barrier properties, the viewpoint of improving the appearance of the curing coating film, and the viewpoint of improving adhesiveness to an inorganic substance, the polyalkylene glycol is still even more preferably polyethylene glycol.

From the viewpoint of improving gas barrier properties and the viewpoint of improving the appearance of the curing coating film, the weight average molecular weight (Mw) of the polyalkylene glycol is preferably from 150 to 10000, more preferably from 200 to 10000, even more preferably from 200 to 5000, and yet even more preferably from 200 to 3000; from the viewpoint of improving gas barrier properties, the viewpoint of improving the appearance of the curing coating film, the viewpoint of blocking suppression, and the viewpoint of improving adhesiveness to an inorganic substance, the weight average molecular weight (Mw) of the polyalkylene glycol is still even more preferably from 200 to 2000, further more preferably from 200 to 1500, even further more preferably from 200 to 1000, and yet further more preferably from 200 to 500.

From the viewpoint of improving gas barrier properties and the viewpoint of improving the appearance of the curing coating film, the content of polyalkylene glycol in the epoxy resin composition is preferably from 0.1 to 5.0 parts by mass, more preferably from 0.2 to 5.0 parts by mass, even more preferably from 0.3 to 3.0 parts by mass, yet even more preferably from 0.5 to 2.0 parts by mass, and still even more preferably from 0.5 to 1.5 parts by mass, per 100 parts by mass of the total amount of the epoxy resin and the non-volatile content in the epoxy resin curing agent.

Unsaturated Fatty Acid Amide Having from 14 to 24 Carbons

The epoxy resin composition according to an embodiment of the present invention preferably contains an unsaturated fatty acid amide having from 14 to 24 carbons (hereafter, also simply referred to as an "unsaturated fatty acid amide"). This can improve the drying speed, facilitate the application to a substrate having a low thermal resistance, and suppress blocking to impart properties suitable for a coating composition. This can also improve the adhesiveness of the curing coating film to an inorganic substance.

The unsaturated fatty acid amide has from 14 to 24 carbons. From the viewpoint of imparting properties suitable for a coating composition and from the viewpoint of improving adhesiveness to an inorganic substance, the unsaturated fatty acid amide preferably has from 16 to 24 carbons, and more preferably from 18 to 22 carbons.

The unsaturated fatty acid constituting the unsaturated fatty acid amide may be a fatty acid having from 14 to 24 carbons with at least one unsaturated bond. The number of unsaturated bonds in the unsaturated fatty acid is preferably from 1 to 6, more preferably from 1 to 4, and even more preferably from 1 to 2.

Examples of the unsaturated fatty acid constituting the unsaturated fatty acid amide include: monounsaturated fatty acids, such as myristoleic acid, sapienic acid, palmitoleic acid, oleic acid, elaidic acid, vaccenic acid, gadoleic acid, eicosenoic acid, erucic acid, and nervonic acid; diunsaturated fatty acids such as linoleic acid, eicosadienoic acid, and docosadienoic acid; triunsaturated fatty acids such as linolenic acid, pinolenic acid, eleostearic acid, mead acid, and eicosatrienoic acid; and tetra fatty acids such as stearidonic acid, arachidonic acid, eicosatetraenoic acid, and adrenic acid. One type of these unsaturated fatty acids can be used, or two or more types of them can be used in combination. Among these unsaturated fatty acids, from the viewpoint of imparting properties suitable for a coating composition and from the viewpoint of improving adhesiveness to an inorganic substance, the unsaturated fatty acid is preferably at least one selected from the group consisting of a monounsaturated fatty acid having from 14 to 24 carbons and a diunsaturated fatty acid having from 14 to 24 carbons, more preferably a monounsaturated fatty acid having from 14 to 24 carbons, even more preferably a monounsaturated fatty acid having from 16 to 24 carbons, and yet even more preferably a monounsaturated fatty acid having from 18 to 22 carbons.

From the viewpoint of imparting properties suitable for a coating composition and from the viewpoint of improving adhesiveness to an inorganic substance, the unsaturated fatty acid amide used in an embodiment of the present invention is preferably at least one selected from the group consisting of palmitoleic acid amide, oleic acid amide, eicosenoic acid amide, and erucic acid amide, more preferably at least one selected from the group consisting of oleic acid amide and erucic acid amide; from the viewpoint of the blocking suppression effect, the unsaturated fatty acid amide used in an embodiment of the present invention is even more preferably erucic acid amide.

Erucic acid amide has solubility in an epoxy resin composition containing an amine-based curing agent; meanwhile, when compared to oleic acid amide or the like, the solubility of erucic acid amide is not too high in the epoxy resin composition, and thus it bleeds out to the surface layer of the epoxy resin composition or a cured product of the epoxy resin composition and acts as a lubricant. Therefore, it is inferred that an epoxy resin composition containing erucic acid amide has improved drying speed, and the blocking suppression effect described above can be produced.

When the unsaturated fatty acid amide is used, the content of the unsaturated fatty acid amide in the epoxy resin composition is preferably from 0.1 to 20.0 parts by mass, more preferably from 0.2 to 15.0 parts by mass, even more preferably from 0.5 to 15.0 parts by mass, yet even more preferably from 1.0 to 15.0 parts by mass, and still even more preferably from 3.0 to 10.0 parts by mass, per 100 parts by mass of the total amount of the epoxy resin and the nonvolatile content in the epoxy resin curing agent. From the viewpoint of improving adhesiveness to an inorganic substance and the viewpoint of blocking suppression effect, the content of the unsaturated fatty acid amide is preferably 0.1 parts by mass or more per 100 parts by mass of the total amount of the epoxy resin and the nonvolatile content in the epoxy resin curing agent in the epoxy resin composition. Further, when the content of the unsaturated fatty acid amide is 20.0 parts by mass or less, the epoxy resin composition can maintain high gas barrier properties and transparency, and elution of the unsaturated fatty acid amide can also be suppressed.

Non-Spherical Inorganic Particles

The epoxy resin composition according to an embodiment of the present invention can further contain non-spherical inorganic particles. When the epoxy resin composition according to an embodiment of the present invention contains non-spherical inorganic particles, an effect of suppressing blocking can be obtained when the epoxy resin composition is used in the formation of a cured product layer of a gas barrier laminate to be described later, and gas barrier properties and bending resistance can be improved.

The shape of the non-spherical inorganic particle is any three-dimensional shape other than spherical shape (substantially true spherical shape), and examples include plate shape, scale shape, column shape, chain shape, and fibrous shape. A plurality of plate-shaped or scale-shaped inorganic particles may be laminated in a layer. Among them, in terms of improving gas barrier properties and bending resistance, the inorganic particles are preferably plate-shaped, scale-shaped, column-shaped, or chain-shaped inorganic particles, more preferably plate-shaped, scale-shaped, or column-shaped inorganic particles, and even more preferably plate-shaped or scale-shaped inorganic particles.

Examples of the inorganic substance constituting the non-spherical inorganic particle include silica, alumina, isinglass (mica), talc, aluminum, bentonite, and smectite. Among them, from the viewpoint of improvement of gas barrier properties and bending resistance, the inorganic substance is preferably at least one selected from the group consisting of silica, alumina, and mica, more preferably at least one selected from the group consisting of silica and alumina, and even more preferably silica.

The non-spherical inorganic particles may be surface treated as necessary for the purpose of increase in dispersibility in the epoxy resin composition and improvement of the transparency of the cured product. Among them, the non-spherical inorganic particles are preferably coated with an organic-based material; when the epoxy resin composition is used to form a cured product layer of the gas barrier laminate, from the viewpoints of improving gas barrier properties, bending resistance, and transparency, the non-spherical inorganic particles are more preferably at least one selected from the group consisting of silica coated with an organic-based material and alumina coated with an organic-based material. From the viewpoints of improving gas barrier properties and bending resistance, the non-spherical inorganic particles are even more preferably silica coated with an organic-based material, and from the viewpoint of transparency, the non-spherical inorganic particles are even more preferably alumina coated with an organic-based material.

The average particle size of the non-spherical inorganic particle is preferably from 1 to 2000 nm, more preferably from 1 to 1500 nm, even more preferably from 1 to 1000 nm, still more preferably from 1 to 800 nm, still even more preferably from 1 to 500 nm, still even more preferably from 5 to 300 nm, still even more preferably from 5 to 200 nm, still even more preferably from 5 to 100 nm, and still even more preferably from 8 to 70 nm. Non-spherical inorganic particles with an average particle size of 1 nm or greater are easy to prepare; meanwhile, non-spherical inorganic particles with an average particle size of 2000 nm or less provide good gas barrier properties, good bending resistance, and good transparency when the epoxy resin composition is used to form a cured product layer of the gas barrier laminate. Here, the average particle size is the average particle size of the primary particle.

When the non-spherical inorganic particle is plate-shaped, scale-shaped, column-shaped, or fibrous-shaped, the aspect ratio of the non-spherical inorganic particle is preferably from 2 to 700 and more preferably from 3 to 500. With the aspect ratio of 2 or greater, good gas barrier properties are easily exhibited. The average particle size and the aspect ratio of the non-spherical inorganic particle are determined, for example, by observing using a scanning electron microscope (SEM) or a transmission electron microscope (TEM) and averaging measured values at three or more points. Note that the average particle size and aspect ratio of the non-spherical inorganic particles present in a cured product layer can be determined, for example, by embedding the gas barrier laminate described later in an epoxy resin, then ion milling a cross-section of the laminate using an ion milling device to produce a sample for cross-sectional observation, and observing and measuring the cross-section of the portion of the cured product layer of the resulting sample in the same manner as described above.

When the average particle size of the non-spherical inorganic particles is less than 100 nm and the measurement of the average particle size by the above method is difficult, the average particle size can also be measured, for example, by the BET method.

When non-spherical inorganic particles are used, the content of the non-spherical inorganic particles in the epoxy resin composition relative to 100 parts by mass of the total amount of the epoxy resin and the epoxy resin curing agent is preferably from 0.5 to 10.0 parts by mass, more preferably from 1.0 to 8.0 parts by mass, even more preferably from 1.5 to 7.5 parts by mass, and still more preferably from 3.0 to 7.0 parts by mass. When the content of the non-spherical inorganic particles in the epoxy resin composition is 0.5 parts by mass or greater per 100 parts by mass of the total amount of the epoxy resin and the epoxy resin curing agent, the effects of improvement of the gas barrier properties and bending resistance when the epoxy resin composition is used to form a cured product layer of the gas barrier laminate are improved. Furthermore, a content thereof of 10.0 parts by mass or less results in good transparency.

The epoxy resin composition may contain an additive, such as a thermosetting resin, a wetting agent, a tackifier, an antifoaming agent, a curing accelerator, an antirust additive, a pigment, and an oxygen scavenger as necessary within a range that does not impair the effects of the present invention.

The total content of these additives in the epoxy resin composition relative to 100 parts by mass of the total amount of the epoxy resin and the epoxy resin curing agent is preferably 20.0 parts by mass or less and more preferably from 0.001 to 15.0 parts by mass.

However, from the viewpoint of achieving the effects of the present invention, the total content of the epoxy resin, the epoxy resin curing agent, and the polyalkylene glycol in the solid content of the epoxy resin composition is preferably 60 mass % or greater, more preferably 70 mass % or greater, even more preferably 80 mass % or greater, and yet even more preferably 85 mass % or greater, with the upper limit being 100 mass %. The "solid content of the epoxy resin composition" means components excluding the water and organic solvent in the epoxy resin composition.

The epoxy resin composition may contain an organic solvent. The organic solvent is preferably a non-reactive solvent. Specific examples of the organic solvent include a protic polar solvent, such as methanol, ethanol, 1-propanol, 2-propanol, 1-butanol, 2-butanol, 2-methoxyethanol, 2-ethoxyethanol, 2-propoxyethanol, 2-butoxyethanol, 1-methoxy-2-propanol, 1-ethoxy-2-propanol, and 1-propoxy-2-propanol, as well as ethyl acetate, butyl acetate, methyl isobutyl ketone, and toluene; one type of these may be used, or two or more types may be used.

Among these, from the viewpoint of improving the appearance of the resulting curing coating film, the organic solvent is preferably at least one selected from the group consisting of methanol, ethanol, and ethyl acetate, more preferably at least one selected from the group consisting of ethanol and ethyl acetate.

Preparation of the Epoxy Resin Composition

The epoxy resin composition can be prepared, for example, by blending a given amount of each of the epoxy resin, the epoxy resin curing agent, the polyalkylene glycol, and optionally, the unsaturated fatty acid amide having from 14 to 24 carbons, a dispersion liquid of the non-spherical inorganic particles, other additives, and the solvent, and then stirring and mixing using a well-known method and apparatus.

A cured product of the epoxy resin composition according to an embodiment of the present invention has excellent gas barrier properties, good appearance, and good adhesiveness to an inorganic substance. For example, a cured product layer formed of the cured product functions as a gas barrier layer having excellent gas barrier properties. Therefore, the epoxy resin composition according to an embodiment of the present invention can be used for a gas barrier coating composition, a gas barrier adhesive, and the like, in addition to the gas barrier laminate described later. However, from the viewpoint of the effectiveness of the effect of the present invention, the epoxy resin composition according to an embodiment of the present invention is more preferably used as a coating composition. This is because the performance required for a coating composition, such as the appearance of the curing coating film and the low blocking characteristics, are not regarded as an important factor for a gas barrier adhesive.

The method for forming the cured product by curing the epoxy resin composition according to an embodiment of the present invention is not particularly limited, and a well-known method can be used. One embodiment thereof is described with regard to a method for producing a gas barrier laminate.

Gas Barrier Laminate

The gas barrier laminate according to an embodiment of the present invention (hereinafter, also referred to simply as a "laminate") is characterized by having a substrate and a cured product layer of the epoxy resin composition (hereinafter, also referred to simply as a "cured product layer").

The gas barrier laminate according to an embodiment of the present invention is a laminate having high gas barrier properties, good appearance, and high interlayer adhesiveness between the substrate and the cured product layer. Materials constituting the gas barrier laminate according to an embodiment of the present invention will be described below.

Substrate

The substrate constituting the gas barrier laminate according to an embodiment of the present invention can be either an inorganic substrate or an organic substrate.

Examples of the inorganic substrate include a metal foil such as an aluminum foil.

The organic substrate is preferably a transparent plastic film. Examples of the transparent plastic film include polyolefin-based films, such as those of low density polyethylene, high density polyethylene, linear low density polyethylene, and polypropylene; polyester-based films, such as those of polyethylene terephthalate, polyethylene naphthalate, and polybutylene terephthalate; polyamide-based films, such as those of nylon 6, nylon 6,6, and poly meta-xylene adipamide (N-MXD6); polyimide-based films; biodegradable films, such as those of polylactic acid; polyacrylonitrile-based films; poly(meth)acrylic-based films; polystyrene-based films; polycarbonate-based films; ethylene-vinyl acetate copolymer saponified substance (EVOH)-based films, and polyvinyl alcohol-based films. Among them, in terms of transparency, strength, and heat resistance, the organic substrate is preferably a film selected from the group consisting of a polyolefin-based film, a polyester-based film, a polyamide-based film, and a polyimide-based film, more preferably a film selected from the group consisting of a polyolefin-based film and a polyester-based film, even more preferably a polypropylene film or a polyethylene terephthalate (PET) film.

The film may be stretched in a uniaxial direction or biaxial direction.

The thickness of the substrate is not limited and can be selected as appropriate in accordance with the application, but in terms of gas barrier properties and strength, the thickness is preferably from 5 to 300 μm, more preferably from 5 to 100 μm, even more preferably from 5 to 50 μm, and yet even more preferably from 5 to 40 μm. When the substrate is an organic substrate, in terms of gas barrier properties and strength, the thickness of the organic substrate is still even more preferably from 8 to 50 μm, further more preferably from 10 to 40 μm.

Cured Product Layer

The cured product layer in the gas barrier laminate according to an embodiment of the present invention is composed of the cured product of the epoxy resin composition. The method for curing the epoxy resin composition is not particularly limited, and curing is implemented by a known method at a temperature and concentration of the epoxy resin composition sufficient for formation of the cured product thereof. The curing temperature can be selected, for example, in a range of from 10 to 140° C.

From the viewpoints of gas barrier properties and bending resistance, the thickness of the cured product layer is preferably 0.05 μm or greater, more preferably 0.08 μm or greater, and even more preferably 0.1 μm or greater. In addition, from the viewpoints of adhesiveness to an inorganic substance and transparency, the thickness of the cured product layer is preferably 20 μm or less, more preferably 10 μm or less, even more preferably 5.0 μm or less, yet even more preferably 2.0 μm or less, still even more preferably 1.0 μm or less, further preferably 0.5 μm or less, and further more preferably 0.4 μm or less. The thickness above is the thickness per one layer of the cured product layer.

The gas barrier laminate according to an embodiment of the present invention may have a substrate and at least one layer of the cured product layer. From the viewpoint of achieving high gas barrier properties, the laminate according to an embodiment of the present invention preferably has at least one layer composed of an inorganic substance. Specifically, the layer composed of an inorganic substance is preferably the inorganic substrate or an inorganic thin film layer.

Inorganic Thin Film Layer

The inorganic thin film layer is provided to impart gas barrier properties to the gas barrier laminate, and can exhibit high gas barrier properties even when the thickness is thin. Examples of the inorganic thin film layer can include an inorganic thin film layer made from a metal foil, and an inorganic thin film layer formed by a vapor deposition method, but from the viewpoint of achieving high transparency, the inorganic thin film layer is preferably one formed by vapor deposition.

The inorganic substance constituting the inorganic thin film layer is not limited as long as it can form a gas barrier thin film on the substrate or on the cured product layer, and examples of the inorganic substance include silicon, aluminum, magnesium, calcium, zinc, tin, nickel, titanium, zirconium, carbon, or oxides, carbides, nitrides, or oxynitrides of the substances listed above. Among them, the inorganic substance is preferably at least one selected from the group consisting of silicon oxides (silica), aluminum, and aluminum oxides (alumina) from the viewpoint of gas barrier properties. One type of the inorganic substances above may be used alone, or two or more types may be used in combination.

The thickness of the inorganic thin film layer is preferably 5 nm or greater from the viewpoints of achieving high gas barrier properties. In addition, in terms of transparency and bending resistance, the thickness is preferably 100 nm or less and more preferably 50 nm or less. The thickness above is a thickness per layer of the inorganic thin film layer.

The method for forming the inorganic thin film layer is not particularly limited, and as vapor deposition methods, examples include well-known vapor deposition methods including physical vapor deposition methods, such as a vacuum deposition method, a sputtering method, and an ion plating method; and chemical vapor deposition methods, such as a plasma chemical vapor deposition method, a thermal chemical vapor deposition method, and a photochemical vapor deposition method. Furthermore, the inorganic thin film layer can be formed by bonding a metal foil such as an aluminum foil to the substrate.

The inorganic thin film layer can be formed, for example, on the organic substrate, or on the cured product layer.

Thermoplastic Resin Layer

Depending on the application, the gas barrier laminate according to an embodiment of the present invention can further include one or two or more layers of a thermoplastic resin layer.

For the thermoplastic resin layer, a thermoplastic resin film is preferably used, and transparent plastic films that are the same as those listed as examples for the organic substrate can be used. Among the transparent plastic films, at least one type selected from the group consisting of a polyolefin-based film and a polyamide-based film is preferred; from the viewpoint of transparency, heat resistance, and suitability for food packaging, at least one type selected from the group consisting of a polypropylene film and a nylon 6 film is more preferred.

The surface of the thermoplastic resin film may be subjected to a surface treatment, such as a flame treatment or a corona discharge treatment. In addition, as the thermoplastic resin film, a film containing an ultraviolet absorber, a colorant, or the like, or a film having a primer layer, an ink layer, a surface protective layer, a vapor-deposited layer, or the like on the surface can also be used.

The thickness of the thermoplastic resin layer is preferably from 10 to 300 μm and is more preferably from 10 to 100 μm. The thickness above is a thickness per layer of the thermoplastic resin layer.

Adhesive Layer

The gas barrier laminate according to an embodiment of the present invention may further include an adhesive layer in order to laminate the thermoplastic resin layer.

As the adhesive constituting the adhesive layer, a well-known adhesive, such as a urethane-based adhesive, an acrylic-based adhesive, or an epoxy-based adhesive, can be used. The thickness of the adhesive layer is not limited, but from the viewpoint of achieving both adhesiveness and transparency, the thickness is preferably from 0.1 to 30 μm, more preferably from 1 to 20 μm, and even more preferably from 2 to 20 μm. The thickness above is a thickness per layer of the adhesive layer.

Layer Constitution of Gas Barrier Laminate

The gas barrier laminate according to an embodiment of the present invention may have a constitution having the substrate and at least one layer of the cured product layer. From the viewpoint of achieving high gas barrier properties, the gas barrier laminate according to an embodiment of the present invention preferably has a layer composed of an inorganic substance, and from the viewpoint of cost efficiency, the gas barrier laminate according to an embodiment of the present invention preferably has a constitution having one layer or two layers of the cured product layer, preferably only one layer of the cured product layer. Further, the layer composed of an inorganic substance is preferably disposed adjacent to the cured product layer.

Examples of a layer constitution of gas barrier laminate having the substrate and one or two layers of the cured product layer while having a layer composed of an inorganic substance are listed below.

(1) A constitution having a substrate and a cured product layer, in which the substrate is an inorganic substrate
(2) A constitution having a substrate, an inorganic thin film layer, and a cured product layer in this order
(3) A constitution having a substrate, a cured product layer, and an inorganic thin film layer in this order
(4) A constitution having a substrate, a cured product layer, an inorganic thin film layer, and a cured product layer in this order The substrate in (2), (3), and (4) described above is preferably an organic substrate. Further, the layer composed of an inorganic substance is preferably disposed adjacent to the cured product layer; from the viewpoint of gas barrier properties, the constitution of any of (1), (2), or (4) described above is preferable, and the constitution of either (1) or (2) described above is more preferable.

The epoxy resin composition according to an embodiment of the present invention can form a curing coating film having good appearance, and in particular, when the epoxy resin composition according to an embodiment of the present invention contains the unsaturated fatty acid amide, the drying speed is improved, blocking is reduced, and the epoxy resin composition has properties suitable for a coating composition. From the viewpoint of the effectiveness of this effect, the configuration (2) or (4) described above is more preferable, and the configuration (2) is even more preferable.

The gas barrier laminate according to an embodiment of the present invention has the layer constitution of any one of (1) to (4) above, and may further have one or two or more layers of the thermoplastic resin layer described above. However, from the viewpoint of the effectiveness of the above-mentioned effects of the epoxy resin composition according to an embodiment of the present invention, it is more preferable that the gas barrier laminate according to an embodiment of the present invention does not have a thermoplastic resin layer in addition to the substrate.

Examples of layer constitutions of the gas barrier laminate include the constitutions illustrated in FIGS. 1 to 9. Hereinafter, in this specification, a laminate having no thermoplastic resin layer other than the substrate is referred to as a "laminate (I)", a laminate in which the total number of layers of substrate and thermoplastic resin layer is 2 is referred to as a "laminate (II)", and a laminate in which the total number of layers of substrate and thermoplastic resin layer is 3 is referred to as a "laminate (III)". From the viewpoint of the effectiveness of the effect of the present invention, the laminate (I) is more preferable.

Figure 2:
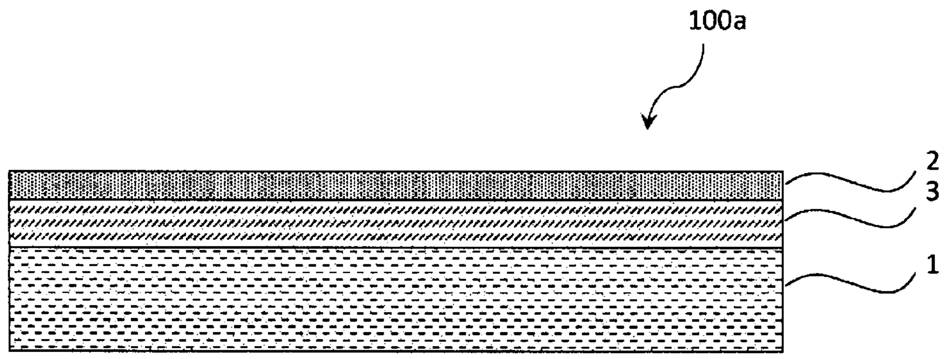
FIG. 2 is a schematic cross-sectional view illustrating a gas barrier laminate 100*a* according to an embodiment of the present invention.

FIGS. 1 and 2 are schematic cross-sectional views illustrating gas barrier laminates (I) according to an embodiment of the present invention. A gas barrier laminate 100 in FIG. 1 has a constitution in which an inorganic thin film layer 2 and a cured product layer 3 are provided on a substrate 1 in this order. In FIG. 1, the inorganic thin film layer 2 is disposed adjacent to the cured product layer 3.

A gas barrier laminate 100*a* in FIG. 2 has a constitution in which a cured product layer 3 and an inorganic thin film layer 2 are provided on a substrate 1 in this order.

FIGS. 3 to 6 are schematic cross-sectional views illustrating gas barrier laminates (II) according to an embodiment of the present invention. The gas barrier laminates of FIGS. 3 to 6 have one layer of substrate and one layer of thermoplastic resin layer (two layers in total), and the thermoplastic resin layer may be laminated directly or via an adhesive layer.

Figure 3:
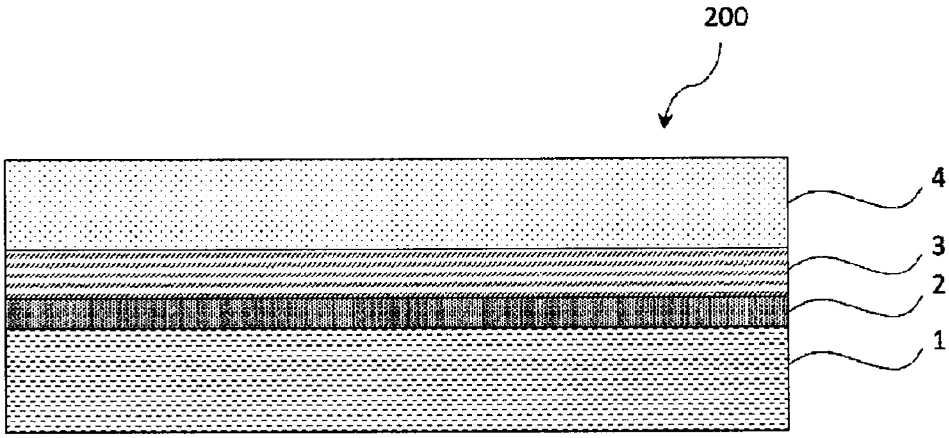
FIG. 3 is a schematic cross-sectional view illustrating a gas barrier laminate 200 according to an embodiment of the present invention.

A gas barrier laminate 200 in FIG. 3 has a constitution in which a thermoplastic resin layer 4 is directly laminated without an adhesive layer interposed therebetween and in which a substrate 1, an inorganic thin film layer 2, a cured product layer 3, and a thermoplastic resin layer 4 are laminated in this order.

Figure 4:
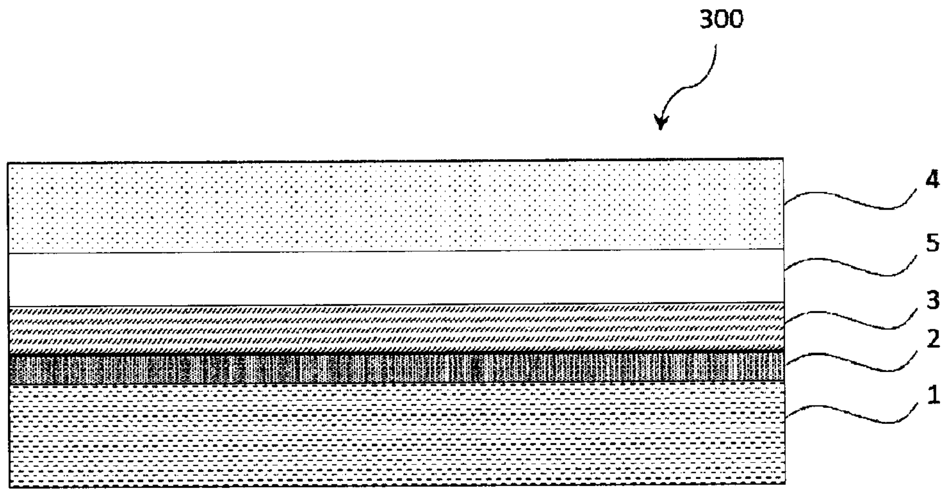
FIG. 4 is a schematic cross-sectional view illustrating a gas barrier laminate 300 according to an embodiment of the present invention.
Figure 5:
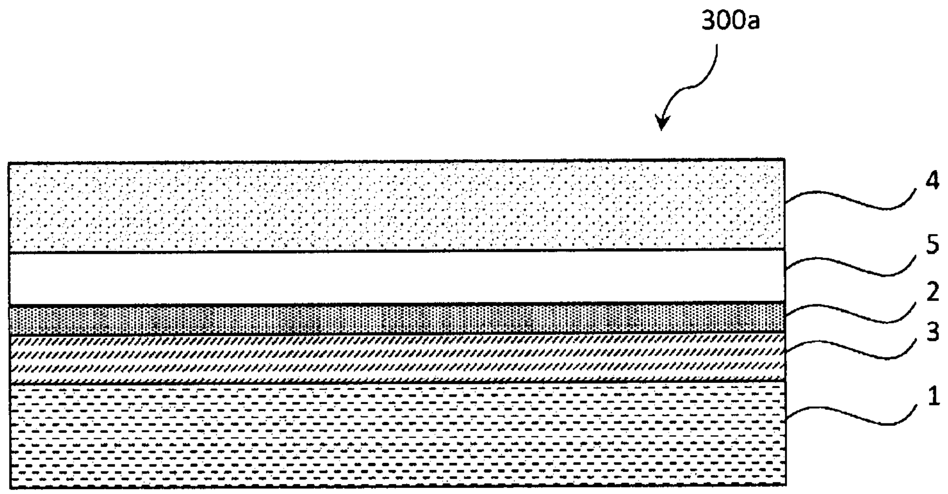
FIG. 5 is a schematic cross-sectional view illustrating a gas barrier laminate 300*a* according to an embodiment of the present invention.
Figure 6:
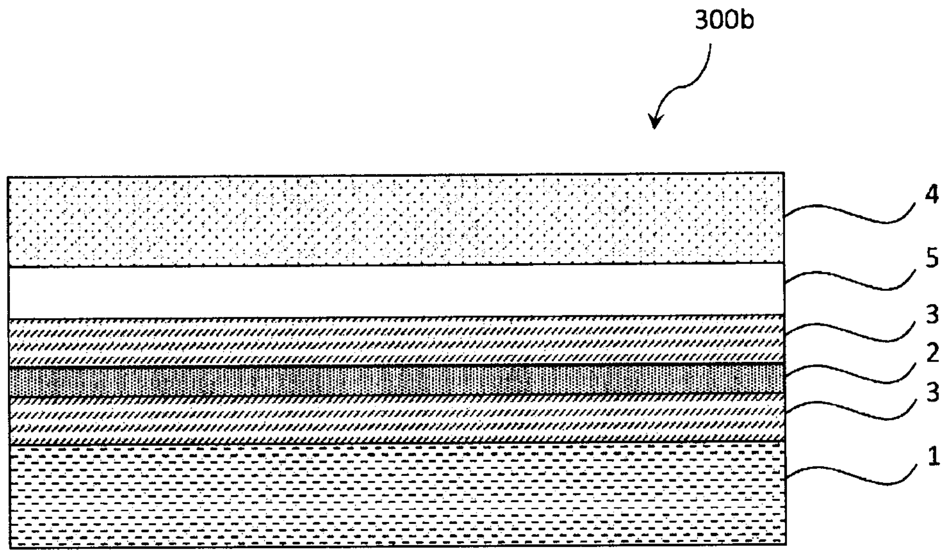
FIG. 6 is a schematic cross-sectional view illustrating a gas barrier laminate 300*b* according to an embodiment of the present invention.

Gas barrier laminates 300, 300*a*, and 300*b* in FIGS. 4 to 6 have a constitution in which a thermoplastic resin layer 4 is laminated with an adhesive layer 5 interposed. The gas barrier laminate 300 in FIG. 4 has a constitution in which a substrate 1, an inorganic thin film layer 2, a cured product layer 3, the adhesive layer 5, and the thermoplastic resin layer 4 are laminated in this order.

The gas barrier laminate 300*a* in FIG. 5 has a constitution in which a substrate 1, a cured product layer 3, an inorganic thin film layer 2, the adhesive layer 5, and the thermoplastic resin layer 4 are laminated in this order.

The gas barrier laminate 300*b* in FIG. 6 has a constitution in which a substrate 1, a cured product layer 3, an inorganic thin film layer 2, a cured product layer 3, the adhesive layer 5, and the thermoplastic resin layer 4 are laminated in this order.

Figure 7:
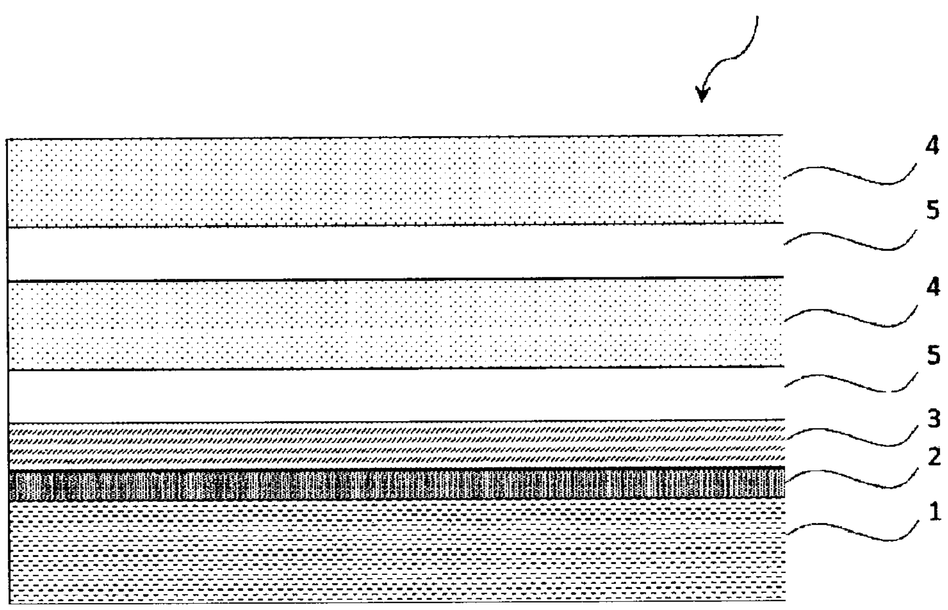
FIG. 7 is a schematic cross-sectional view illustrating a gas barrier laminate 400 according to an embodiment of the present invention.
Figure 8:
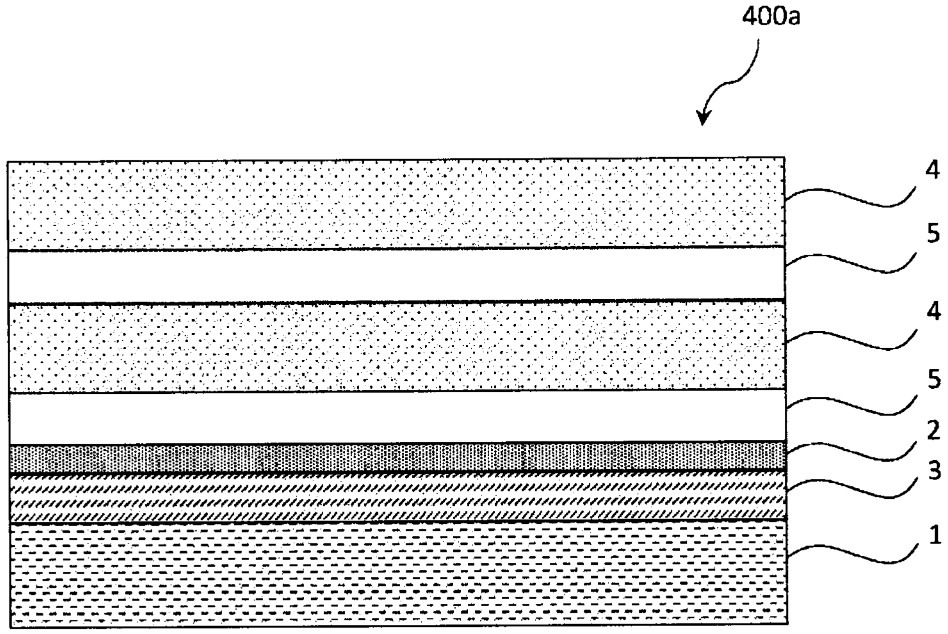
FIG. 8 is a schematic cross-sectional view illustrating a gas barrier laminate 400*a* according to an embodiment of the present invention.
Figure 9:
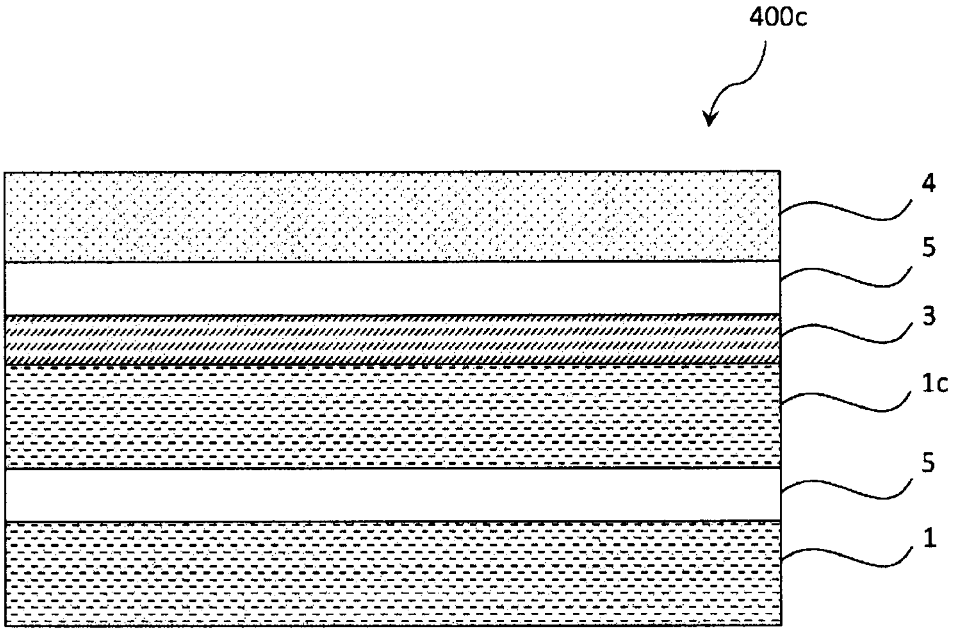
FIG. 9 is a schematic cross-sectional view illustrating a gas barrier laminate 400*c* according to an embodiment of the present invention.

FIGS. 7 to 9 are schematic cross-sectional views illustrating gas barrier laminates (III) according to an embodiment of the present invention. The gas barrier laminates of FIGS. 7 and 8 have one layer of substrate and two layers of thermoplastic resin layer (three layers in total), and the gas barrier laminate of FIG. 9 has two layers of substrate and one layer of thermoplastic resin layer (three layers in total).

The gas barrier laminate 400 of FIG. 7 has a constitution in which a substrate 1, an inorganic thin film layer 2, a cured product layer 3, an adhesive layer 5, a thermoplastic resin layer 4, an adhesive layer 5, and a thermoplastic resin layer 4 are laminated in this order.

The gas barrier laminate 400*a* of FIG. 8 has a constitution in which a substrate 1, a cured product layer 3, an inorganic thin film layer 2, an adhesive layer 5, a thermoplastic resin layer 4, an adhesive layer 5, and a thermoplastic resin layer 4 are laminated in this order.

The gas barrier laminate 400*c* of FIG. 9 has a constitution in which a substrate 1, an adhesive layer 5, a substrate 1*c*, a cured product layer 3, an adhesive layer 5, and a thermoplastic resin layer 4 are laminated in this order. At least one of the substrates is preferably an inorganic substrate, and for example, the substrate 1*c* is an inorganic substrate.

The thermoplastic resin layers 4 constituting the gas barrier laminate 400 or 400*a* may all be the same resin layer or may be different resin layers from each other. Further, the adhesive layers 5 may be layers made of the same adhesive or layers made of different adhesives.

However, the gas barrier laminate of the present invention is not limited to the layer constitutions illustrated in FIGS. 1 to 9. In addition, an optional layer, such as a primer layer, an ink layer such as a print layer, an adhesive layer, a surface protective layer, or a vapor-deposited layer, may be further laminated on the laminate according to an embodiment of the present invention.

Method for Producing Gas Barrier Laminate

The method for producing the gas barrier laminate according to an embodiment of the present invention is not limited, and a known method can be used.

Examples of the method for producing the gas barrier laminate 100 having the constitution illustrated in FIG. 1 include a method of forming an inorganic thin film layer on one side of a substrate, applying, at a desired thickness, the epoxy resin composition for forming a cured product layer onto the surface on the side with the inorganic thin film layer, and then curing the epoxy resin composition to form a cured product layer. Alternatively, the method may include using a film in which an inorganic thin film layer is formed on a transparent plastic film in advance and then forming a cured product layer on the surface of the inorganic thin film layer.

Examples of the method for producing the gas barrier laminate 100*a* having the constitution illustrated in FIG. 2 include a method of applying the epoxy resin composition onto one side of the substrate, then curing the epoxy resin composition to form a cured product layer, and forming an inorganic thin film layer on the cured product layer.

Examples of the application method for applying the epoxy resin composition include bar coating, Meyer bar coating, air knife coating, gravure coating, reverse gravure coating, micro gravure coating, micro reverse gravure coating, die coating, slot die coating, vacuum die coating, dip coating, spin coating, roll coating, spray coating, and coating with a brush. Among these, bar coating, roll coating, or spray coating is preferred, and gravure coating, reverse gravure coating, micro gravure coating, or micro reverse gravure coating is industrially preferred.

After the epoxy resin composition has been applied by coating, a step (drying step) of volatilizing the solvent is implemented as necessary. Conditions during the drying step can be selected as appropriate, and the drying step can be performed, for example, at a drying temperature of from 40 to 180° C. and a drying time of from 5 to 180 seconds.

When the epoxy resin composition according to an embodiment of the present invention contains the unsaturated fatty acid amide having from 14 to 24 carbons, the drying speed is improved, and thus the drying temperature can be lowered. From the viewpoint of enabling the use of a substrate having a low heat resistance, the drying temperature is preferably from 40 to 120° C., more preferably from 40 to 100° C., and even more preferably from 50 to 90° C.

After the drying has been performed, the epoxy resin composition is cured to form a cured product layer. The curing temperature can be selected, for example, in a range of from 10 to 140° C., and is preferably in a range of from 10 to 80° C. The curing time can be selected, for example, in a range of from 0.5 to 200 hours, and is preferably in a range of from 2 to 100 hours.

Examples of a method for producing the gas barrier laminate 200 having the constitution illustrated in FIG. 3 include a method which includes forming an inorganic thin film layer on a substrate, applying the epoxy resin composition described above onto the surface of the inorganic thin film layer, then immediately bonding a thermoplastic resin film constituting a thermoplastic resin layer to the coated surface using a nip roll or the like, and subsequently curing the epoxy resin composition by the method described above. In this case, the epoxy resin composition constituting the cured product layer also functions as an adhesive layer that bonds the inorganic thin film layer and the thermoplastic resin film in the gas barrier laminate 200 together.

Examples of a method for producing the gas barrier laminate 300 having the constitution illustrated in FIG. 4 include a method of applying an adhesive constituting an adhesive layer onto the surface of the cured product layer of the gas barrier laminate 100 having the constitution illustrated in FIG. 1, or applying an adhesive constituting an adhesive layer onto the surface on one side of a thermoplastic resin film, and then laminating the two. The gas barrier laminate 300*a* having the constitution illustrated in FIG. 5 can be produced in the same manner using the gas barrier laminate 100*a* having the constitution illustrated in FIG. 2.

Examples of a method for producing the gas barrier laminate 300*b* having the constitution illustrated in FIG. 6 include a method of forming a cured product layer on the surface of the inorganic thin film layer of the gas barrier laminate 100*a* having the constitution illustrated in FIG. 2, applying an adhesive constituting an adhesive layer onto the surface of the cured product layer or onto the surface on one side of a thermoplastic resin film, and then laminating the two.

The gas barrier laminate 400 having the constitution illustrated in FIG. 7 can be produced by forming the gas barrier laminate 300 having the constitution illustrated in FIG. 4 and then repeating the step of laminating by applying an adhesive and attaching a thermoplastic resin film. The gas barrier laminate 400*a* having the constitution illustrated in FIG. 8 can be produced in the same manner using the gas barrier laminate 300*a* having the constitution illustrated in FIG. 5.

Examples of a method for producing the gas barrier laminate 400*c* having the constitution illustrated in FIG. 9 include a method of laminating the substrate 1, the adhesive layer 5, and the substrate 1*c* in this order, forming a cured product layer on the surface of the substrate 1*c*, then applying an adhesive constituting an adhesive layer onto the surface of the cured product layer or onto the surface on one side of a thermoplastic resin film, and then laminating the two.

Characteristics of Gas Barrier Laminate

The gas barrier laminate according to an embodiment of the present invention has excellent gas barrier properties. For example, the oxygen transmission rate of the gas barrier laminate (I) at 23° C. and a relative humidity of 60%, although varies depending on the barrier properties of the substrate that is used, is preferably 10 cc/($m^2$·day·atm) or less, more preferably 2 cc/($m^2$·day·atm) or less, and even more preferably 1 cc/($m^2$·day·atm) or less.

The water vapor transmission rate of the gas barrier laminate (I) at 40° C. and a relative humidity of 90%, although varies depending on the barrier properties of the substrate that is used, is preferably 1 g/($m^2$·day) or less, more preferably 0.8 g/($m^2$·day) or less, and even more preferably 0.5 g/($m^2$·day) or less.

The oxygen transmission rate and the water vapor transmission rate of the gas barrier laminate are specifically determined by methods described in Examples.

Further, the gas barrier laminate according to an embodiment of the present invention includes the cured product layer and thereby has a good appearance. Specifically, when the epoxy resin composition according to an embodiment of the present invention forms a cured product layer, uneven coating is less likely to occur, and the surface of the cured product layer has high gloss. The appearance (presence of uneven coating and gloss) of the gas barrier laminate can be specifically evaluated by methods described in Examples.

Packaging Material

A packaging material according to an embodiment of the present invention includes the gas barrier laminate.

The gas barrier laminate according to an embodiment of the present invention has excellent gas barrier properties, excellent bending resistance, and good appearance, and suitably used for packaging material applications for protecting food products, pharmaceuticals, cosmetics, precision electronic components, or the like. The packaging material according to an embodiment of the present invention may be one in which the gas barrier laminate is used as-is, or may be one in which another layer or film is further laminated.

The form of the packaging material can be selected as appropriate depending on the article to be contained and stored, and examples of the form thereof include: packaging films; packaging containers such as packaging bags and bottles; and lid materials and sealing materials for packaging containers.

The capacity of the packaging material is also not limited, and can be selected as appropriate depending on the article to be contained and stored.

EXAMPLES

Next, the present invention will be described specifically with reference to examples. However, the present invention is not limited in any way by these examples.

Measurements and evaluations in the present examples were performed by the following methods.

Thickness of Cured Product Layer

The thickness of cured product layer was measured using a multilayer film thickness measuring device ("DC-8200" available from Gunze Limited).

Appearance (Presence of Uneven Coating)

In the production of the gas barrier laminate (I) of each example, an aluminum vapor-deposited PET or an aluminum vapor-deposited OPP used in each example was coated with the epoxy resin composition. A hot air dryer ("SAFETY OVEN SPHH-201" available from ESPEC Corp.) set to 80° C. was used to blow hot air from a distance of 15 cm perpendicularly onto the coated surface for 30 seconds, and the appearance of the coating film surface was visually observed. A case in which no change in appearance was observed was evaluated as "good", and a case in which a change in appearance (uneven coating) occurred was evaluated as "poor".

Reflectance

The reflectance of the surface of the cured product layer of the gas barrier laminate (I) formed in each example was measured in accordance with JIS K5600-4-7:1999. Using a gloss meter ("Elcometer 480" available from Elcometer Ltd.), the ratio (reflectance; %) of the intensity of the reflected light to the intensity of the incident light was measured when light was incident on the surface of the cured product layer of the gas barrier laminate (I) in scan mode at an incident angle of 60°. The higher the reflectance, the higher the gloss of the surface of the cured product layer. Regarding the aluminum vapor-deposited PET and aluminum vapor-deposited OPP of the reference examples, the reflectance of the aluminum vapor-deposited surface was measured.

Oxygen Transmission Rate (cc/($m^2$·Day·Atm))

The oxygen transmission rates of the aluminum vapor-deposited PET and aluminum vapor-deposited OPP used in each example and of the gas barrier laminate produced in each example were measured using an oxygen transmission rate measuring device ("OX-TRAN 2/21" available from Modern Controls Inc.) at a temperature of 23° C. and a relative humidity of 60%.

Water Vapor Transmission Rate (g/($m^2$·Day))

The water vapor transmission rates of the aluminum vapor-deposited PET and aluminum vapor-deposited OPP used in each example and of the gas barrier laminate produced in each example were measured using a water vapor transmission rate measurement device (PERMA-TRAN-W 1/50 available from MOCON, Inc.) at a temperature of 40° C. and a relative humidity of 90%.

Peel Strength

The peel strengths of the aluminum vapor-deposited PET and aluminum vapor-deposited OPP used in each example and of the gas barrier laminate (I) produced in each example were measured by the following method.

A urethane adhesive was applied to the aluminum vapor-deposited surface in the case of the aluminum vapor-deposited PET and aluminum vapor-deposited OPP or the surface on the side of the cured product layer in the case of the gas barrier laminate produced in each example, using a bar coater No. 12, and drying was performed at 80° C. for 10 seconds, to form an adhesive layer (thickness after drying: approximately 3 μm). The urethane adhesive used was prepared by adding 0.8 g of a curing agent "CAT-RT37" and 38.7 g of ethyl acetate as a solvent to 17 g of a primary agent "TM-569" available from Toyo-Morton, Ltd. and stirring the mixture well. A polypropylene film ("P1146" available from Toyobo Co., Ltd.) having a thickness of 50 μm was bonded thereon using a nip roll, and heating was performed for two days at 40° C., resulting in a laminate for peel strength testing.

The peel strength (g/15 mm) of the laminate was measured in accordance with the method specified in JIS K6854-3:1999, by a T-peel test at a peel rate of 300 mm/min A peel strength of 100 g/15 mm or more is considered acceptable.

Production Example 1 (Preparation of Epoxy Resin Curing Agent Solution A)

A reaction vessel was charged with 1 mol of meta-xylylenediamine (MXDA). The temperature was raised to 60° C. under a nitrogen stream, and 0.93 mol of methyl acrylate was added dropwise over 1 hour. The temperature was increased to 165° C. while generated methanol was distilled off, and the temperature was then maintained at 165° C. for 2.5 hours, and thus an amine-based curing agent was produced. Ethanol was added dropwise over 1.5 hours to prepare a solution containing 65.0 mass % of the amine-based curing agent and 35.0 mass % of ethanol.

Amounts of 166.8 g of ethanol and 200.2 g of ethyl acetate, as a diluting solvent, and 94.9 g of the solution described above were added and stirred. To this mixture, 4.64 g of an erucic acid amide ("ALFLOW P-10" available from NOF CORPORATION) and 3-aminopropyltriethoxysilane ("KBE-903" available from Shin-Etsu Chemical Co., Ltd.), serving as a silane coupling agent, were added and stirred, resulting in an epoxy resin curing agent solution A.

Production Example 2 (Preparation of Epoxy Resin Curing Agent Solution B)

A solution was prepared in the same manner as in Production Example 1 except that the erucic acid amide in Production Example 1 was not added, resulting in an epoxy resin curing agent solution B.

Example a (Preparation of Epoxy Resin Composition)

29.0 g of ethanol as a diluting solvent was added to 3.75 g of the epoxy resin curing agent solution A produced in Production Example 1, and the mixture was stirred well. To this mixture, 0.10 g of an epoxy resin ("TETRAD-X", available from Mitsubishi Gas Chemical Co., Inc.) having a glycidylamino group derived from meta-xylylenediamine [(number of active amine hydrogens in the epoxy resin curing agent)/(number of epoxy groups in the epoxy resin) =3.0] serving as an epoxy resin and 0.007 g of polyethylene glycol ("PEG1000" available from Fujifilm Wako Pure Chemical Corporation, Mw 1000) were added and stirred, resulting in an epoxy resin composition. The blending amount of polyethylene glycol was 1.0 parts by mass while the blending amount of the erucic acid amide was 5.0 parts by mass, per 100 parts by mass of the total amount of the epoxy resin and the nonvolatile content in the epoxy resin curing agent solution A in the epoxy resin composition.

Example B

An epoxy resin composition was prepared in the same manner as in Example A, except that the epoxy resin curing agent solution B produced in Production Example 2 was used instead of the epoxy resin curing agent solution A produced in Production Example 1 and used in Example A.

Example C

An epoxy resin composition was prepared in the same manner as in Example A, except that polytetramethylene ether glycol (PTMG, available from Mitsubishi Chemical Corporation, Mw 1000) was used instead of polyethylene glycol "PEG1000" used in Example A.

Example D

An epoxy resin composition was prepared in the same manner as in Example A, except that polyethylene glycol "PEG200" (available from Fujifilm Wako Pure Chemical Corporation, Mw 200) was used instead of polyethylene glycol "PEG1000" used in Example A.

Example E

An epoxy resin composition was prepared in the same manner as in Example A, except that the blending amount of polyethylene glycol used in Example A was changed to 0.014 g.

Example F

An epoxy resin composition was prepared in the same manner as in Example A, except that the blending amount of polyethylene glycol used in Example A was changed to 0.021 g.

Comparative Example A

An epoxy resin composition was prepared in the same manner as in Example A, except that polyethylene glycol used in Example A was not blended.

Comparative Example B

An epoxy resin composition was prepared in the same manner as in Example A, except that dipropylene glycol monomethyl ether (DPGME, available from Tokyo Chemical Industry Co., Ltd., Mw 148) was used instead of polyethylene glycol "PEG1000" used in Example A.

The compositions of the epoxy resin compositions are presented in Table 1. Note that the blending amounts in Table 1 are all blending amounts (parts by mass) in terms of effective amounts.

TABLE 1

| | Epoxy Resin Composition | | | | | | | |
|---|---|---|---|---|---|---|---|---|
| | | Epoxy Resin Curing Agent Solution | | Number of active amine hydrogens in curing agent/Number of epoxy groups in epoxy resin | Polyalkylene Glycol | | Unsaturated Fatty Acid Amide | |
| | Epoxy Resin | Type | Silane Coupling Agent Parts by Mass *1) | | Type | Parts by Mass *2) | Type | Parts by Mass *2) |
| Example A | TETRAD-X | A | 3.0 | 3.0 | PEG1000 | 1.0 | Erucic Acid Amide | 5.0 |
| Example B | TETRAD-X | B | 3.0 | 3.0 | PEG1000 | 1.0 | — | — |

TABLE 1-continued

| | Epoxy Resin Composition | | | | | | | |
|---|---|---|---|---|---|---|---|---|
| | | Epoxy Resin Curing Agent Solution | | Number of active amine hydrogens in | | | | |
| | | | Silane Coupling | curing agent/ | Polyalkylene Glycol | | Unsaturated Fatty Acid Amide | |
| | Epoxy Resin | Type | Agent Parts by Mass *1) | Number of epoxy groups in epoxy resin | Type | Parts by Mass *2) | Type | Parts by Mass *2) |
| Example C | TETRAD-X | A | 3.0 | 3.0 | PTMG | 1.0 | Erucic Acid Amide | 5.0 |
| Example D | TETRAD-X | A | 3.0 | 3.0 | PEG200 | 1.0 | Erucic Acid Amide | 5.0 |
| Example E | TETRAD-X | A | 3.0 | 3.0 | PEG1000 | 2.0 | Erucic Acid Amide | 5.0 |
| Example F | TETRAD-X | A | 3.0 | 3.0 | PEG1000 | 3.0 | Erucic Acid Amide | 5.0 |
| Comparative Example A | TETRAD-X | A | 3.0 | 3.0 | — | — | Erucic Acid Amide | 5.0 |
| Comparative Example B | TETRAD-X | A | 3.0 | 3.0 | DPGME | 1.0 | Erucic Acid Amide | 5.0 |

*1) Parts by mass relative to 100 parts by mass of the total amount of the epoxy resin and the curing agent

*2) Parts by mass relative to 100 parts by mass of the total amount of the epoxy resin and the nonvolatile content in the epoxy resin curing agent solution

Example 1 [Production and Evaluation of Gas Barrier Laminate (I)]

The epoxy resin composition prepared in Example A was applied, using a bar coater No. 3, to the aluminum vapor-deposited surface of an aluminum vapor-deposited PET ("MLPET" available from Mitsui Chemicals Tohcello, Inc., thickness: 12 μm) in which aluminum was vapor-deposited on one side of PET. The epoxy resin composition was heated and dried for 30 seconds in an 80° C. drying oven (thickness after drying: 0.1 μm); then, aging was performed at 40° C. for 2 days, resulting in a gas barrier laminate (I) having the constitution illustrated in FIG. 1.

The produced gas barrier laminate was subjected to various evaluations by the methods described above. The results are presented in Table 2.

Examples 2 to 6 and Comparative Examples 1 and 2

Gas barrier laminates were produced and evaluated in the same manner as in Example 1, except that the epoxy resin composition used in Example 1 was changed to the epoxy resin compositions presented in Table 2. The results are presented in Table 2.

Example 7

A gas barrier laminate was produced and evaluated in the same manner as in Example 1, except that the substrate used in Example 1 was changed to an aluminum vapor-deposited OPP ("MLOP102" available from Mitsui Chemicals Tohcello, Inc., thickness: 25 μm) in which aluminum was vapor-deposited on one side of a biaxially stretched polypropylene (OPP). The results are presented in Table 2.

Example 8

A gas barrier laminate was prepared and evaluated in the same manner as in Example 7, except that the epoxy resin composition used in Example 7 was changed to the epoxy resin composition presented in Table 2, and that the epoxy resin composition was applied to the aluminum vapor-deposited OPP and then heated and dried in a drying oven at 80° C. for 60 seconds. The results are presented in Table 2.

Example 9, Comparative Examples 3 to 4

Gas barrier laminates were produced and evaluated in the same manner as in Example 7, except that the epoxy resin composition used in Example 7 was changed to the epoxy resin compositions presented in Table 2. The results are presented in Table 2.

In Table 2, "Reference Example 1" contains the evaluation results of the aluminum vapor-deposited PET by itself. Further, "Reference Example 2" contains the evaluation results of the aluminum vapor-deposited OPP by itself.

TABLE 2

| | Epoxy Resin Composition | | | | | Evaluations of Gas Barrier Laminate (I) | | | | | | |
|---|---|---|---|---|---|---|---|---|---|---|---|---|
| | | Polyalkylene Glycol | | Unsaturated Fatty Acid Amide | | | | | | | | |
| | No. | Type | Parts by Mass *1) | Type | Parts by Mass *1) | Substrate — | Thickness of Cured Product Layer µm | Appearance (Presence of Uneven Coating) — | Reflectance % | Oxygen Trans-mission Rate (23° C./60% RH) cc/(m$^2$ · day · atm) | Water Vapor Transmission Rate (40° C./90% RH) g/(m$^2$ · day) | Peel Strength g/15 mm |
| Example 1 | Example A | PEG1000 | 1.0 | Erucic Acid Amide | 5.0 | Al Vapor-deposited PET | 0.1 | Good | 62.9 | 0.5 | 0.5 | 190 |
| Example 2 | Example B | PEG1000 | 1.0 | — | — | Al Vapor-deposited PET | 0.1 | Good | 64.6 | 0.3 | 0.6 | 335 |
| Example 3 | Example C | PTMG | 1.0 | Erucic Acid Amide | 5.0 | Al Vapor-deposited PET | 0.1 | Good | 62.6 | 0.5 | 0.5 | 215 |
| Example 4 | Example D | PEG200 | 1.0 | Erucic Acid Amide | 5.0 | Al Vapor-deposited PET | 0.1 | Good | 64.1 | 0.3 | 0.4 | 230 |
| Example 5 | Example E | PEG1000 | 2.0 | Erucic Acid Amide | 5.0 | Al Vapor-deposited PET | 0.1 | Good | 63.2 | 0.4 | 0.6 | 220 |
| Example 6 | Example F | PEG1000 | 3.0 | Erucic Acid Amide | 5.0 | Al Vapor-deposited PET | 0.1 | Good | 62.3 | 0.5 | 0.7 | 240 |
| Comparative Example 1 | Comparative Example A | — | — | Erucic Acid Amide | 5.0 | Al Vapor-deposited PET | 0.1 | Poor | 60.2 | 0.6 | 0.7 | 200 |
| Comparative Example 2 | Comparative Example B | DPGME | 1.0 | Erucic Acid Amide | 5.0 | Al Vapor-deposited PET | 0.1 | Poor | 61.8 | 0.6 | 0.6 | 280 |
| Reference Example 1 | — | — | — | — | — | Al Vapor-deposited PET | — | Good | 62.2 | 0.8 | 0.9 | 260 |
| Example 7 | Example A | PEG1000 | 1.0 | Erucic Acid Amide | 5.0 | Al Vapor-deposited OPP | 0.1 | Good | 74.7 | 8.3 | 0.3 | 285 |
| Example 8 | Example B | PEG1000 | 1.0 | — | — | Al Vapor-deposited OPP | 0.1 | Good | 75.8 | 15.3 | 0.3 | 180 |
| Example 9 | Example C | PTMG | 1.0 | Erucic Acid Amide | 5.0 | Al Vapor-deposited OPP | 0.1 | Good | 70.4 | 10.4 | 0.4 | 190 |
| Comparative Example 3 | Comparative Example A | — | — | Erucic Acid Amide | 5.0 | Al Vapor-deposited OPP | 0.1 | Poor | 68.0 | 10.5 | 0.5 | 225 |
| Comparative Example 4 | Comparative Example B | DPGME | 1.0 | Erucic Acid Amide | 5.0 | Al Vapor-deposited OPP | 0.1 | Poor | 69.5 | 14.4 | 0.3 | 135 |
| Reference Example 2 | — | — | — | — | — | Al Vapor-deposited OPP | — | Good | 79.2 | 25.0 | 0.6 | 320 |

*1) Parts by mass relative to 100 parts by mass of the total amount of the epoxy resin and the nonvolatile content in the epoxy resin curing agent solution Table 2 indicates that the gas barrier laminates produced using the epoxy resin compositions of the present Examples had good appearance since there were no uneven coating of the epoxy resin compositions and the reflectance of the surfaces of the cured product layers of the gas barrier laminates produced using the epoxy resin compositions of the present Examples were higher than that of the gas barrier laminates of the Comparative Examples, indicating improved gloss. In addition, the gas barrier laminates of the present Examples had good barrier properties against oxygen and water vapor. The peel strengths were also acceptable.

Example 10 [Production and Evaluation of Gas Barrier Laminate (II)]

The epoxy resin composition prepared in Example B was applied, using a bar coater No. 8, to the aluminum vapor-deposited surface of an aluminum vapor-deposited OPP ("MLOP102" available from Mitsui Chemicals Tohcello, Inc., thickness: 25 μm) in which aluminum was vapor-deposited on one side of a biaxially stretched polypropylene (OPP). The epoxy resin composition was dried by heating at 80° C. for 30 seconds (thickness after drying: approximately 3 μm). A polypropylene film ("P1146" available from Toyobo Co., Ltd.) having a thickness of 50 μm was immediately bonded thereon using a nip roll, and aging was performed for two days at 40° C., resulting in a gas barrier laminate (II) having the constitution illustrated in FIG. 3.

The produced gas barrier laminate (II) was subjected to measurements of oxygen transmission rate, water vapor transmission rate, and peel strength using the methods described above. The peel strength (g/15 mm) of the gas barrier laminate (II) was measured in accordance with the method specified in JIS K6854-3:1999, by a T-peel test at a peel rate of 300 mm/min. The results are presented in Table 3.

Reference Example 3

Instead of the epoxy resin composition prepared in Example B in Example 10, a urethane adhesive was applied, using a bar coater No. 12, to the aluminum vapor-deposited surface of an aluminum vapor-deposited OPP, and drying was performed at 80° C. for 10 seconds, forming an adhesive layer (thickness after drying: approximately 3 μm). The urethane adhesive used was prepared by adding 0.8 g of a curing agent "CAT-RT37" and 38.7 g of ethyl acetate as a solvent to 17 g of a primary agent "TM-569" available from Toyo-Morton, Ltd. and stirring the mixture well. A polypropylene film ("P1146" available from Toyobo Co., Ltd.) having a thickness of 50 μm was bonded thereon using a nip roll, and aging was performed for two days at 40° C., and a laminate was produced.

The produced laminate was subjected to measurements of oxygen transmission rate, water vapor transmission rate, and peel strength using the methods described above. The results are presented in Table 3.

TABLE 3

| | Epoxy Resin Composition | | | | | Evaluations of Gas Barrier Laminate (II) | | | |
|---|---|---|---|---|---|---|---|---|---|
| | | Polyalkylene Glycol | | Unsaturated Fatty Acid Amide | | | Oxygen Transmission Rate | Water Vapor Transmission Rate | |
| | No. | Type | Parts by Mass *1) | Type | Parts by Mass *1) | Substrate — | (23° C./60% RH) cc/(m$^2$ · day · atm) | (40° C./90% RH) g/(m$^2$ · day) | Peel Strength g/15 mm |
| Example 10 | Example B | PEG1000 | 1.0 | — | — | Al Vapor-deposited OPP | 0.2 | 0.3 | 105 |
| Reference Example 3 | — | — | — | — | — | Al Vapor-deposited OPP | 6.7 | 0.3 | 330 |

*1) Parts by mass relative to 100 parts by mass of the total amount of the epoxy resin and the nonvolatile content in the epoxy resin curing agent solution Table 3 indicates that the epoxy resin composition according to an embodiment of the present invention exhibited high gas barrier properties even when it was used to form an adhesive layer of a laminate film. The peel strength was also acceptable.

Example 11 [Production and Evaluation of Gas Barrier Laminate (I)]

The epoxy resin composition prepared in Example A was applied, using a bar coater No. 3, to one side of a biaxially stretched polypropylene film ("FOR" available from Futamura Chemical Co., Ltd., thickness: 20 μm). The epoxy resin composition was heated and dried for 30 seconds in an 80° C. drying oven (thickness after drying: 0.1 μm); then, aging was performed at 40° C. for 2 days, resulting in a cured product layer. Next, an aluminum vapor-deposited layer having a thickness of 40 nm was formed on the surface of the cured product layer by a vacuum deposition method, resulting in a gas barrier laminate (I) having the constitution illustrated in FIG. 2.

The produced gas barrier laminate was subjected to measurements of oxygen transmission rate and peel strength using the methods described above. The results are presented in Table 4.

Reference Example 4

The epoxy resin composition prepared in Example A used in Example 11 was not used, and an aluminum vapor-deposited layer having a thickness of 40 nm was formed on one side of a biaxially stretched polypropylene film having a thickness of 20 μm by a vacuum deposition method, resulting in a vapor-deposited film. The produced vapor-deposited film was subjected to measurements of oxygen transmission rate and peel strength using the methods described above. The results are presented in Table 4.

Example 12

The epoxy resin composition prepared in Example A was applied, using a bar coater No. 3, to one side of a biaxially stretched polypropylene film ("FOR" available from Futamura Chemical Co., Ltd., thickness: 20 μm). The epoxy resin composition was heated and dried for 30 seconds in an 80° C. drying oven (thickness after drying: 0.1 μm); then, aging was performed at for 2 days, resulting in a cured product layer. Next, an alumina vapor-deposited layer having a thickness of 20 nm was formed on the surface of the cured product layer by a vacuum deposition method, resulting in a gas barrier laminate (I) having the constitution illustrated in FIG. 2.

The produced gas barrier laminate was subjected to measurements of oxygen transmission rate and peel strength using the methods described above. The results are presented in Table 4. Note that in the measurement of peel strength, the urethane adhesive used was prepared by adding 1.05 g of a curing agent "CAT-RT85" and 25 g of ethyl acetate as a solvent to 15 g of a primary agent "AD-502", available from Toyo-Morton, Ltd., and stirring the mixture well.

Reference Example 5

The epoxy resin composition prepared in Example A used in Example 12 was not used, and an alumina vapor-deposited layer having a thickness of 20 nm was formed on one side of a biaxially stretched polypropylene film having a thickness of 20 μm by a vacuum deposition method, resulting in a vapor-deposited film. The produced vapor-deposited film was subjected to measurements of oxygen transmission rate and peel strength using the same methods as in Example 12. The results are presented in Table 4.

Example 13

The epoxy resin composition prepared in Example A was applied, using a bar coater No. 3, to one side of a biaxially stretched polypropylene film ("FOR" available from Futamura Chemical Co., Ltd., thickness: 20 μm). The epoxy resin composition was heated and dried for 30 seconds in an 80° C. drying oven (thickness after drying: 0.1 μm); then, aging was performed at for 2 days, resulting in a cured product layer. Next, a silica vapor-deposited layer having a thickness of 20 nm was formed on the surface of the cured product layer by a sputtering method, resulting in a gas barrier laminate (I) having the constitution illustrated in FIG. 2.

The produced gas barrier laminate was subjected to measurements of oxygen transmission rate and peel strength using the methods described above. The results are presented in Table 4. Note that in the measurement of peel strength, the urethane adhesive used was prepared by adding 1.05 g of a curing agent "CAT-RT85" and 25 g of ethyl acetate as a solvent to 15 g of a primary agent "AD-502", available from Toyo-Morton, Ltd., and stirring the mixture well.

Reference Example 6

The epoxy resin composition prepared in Example A used in Example 13 was not used, and a silica vapor-deposited layer having a thickness of 20 nm was formed on one side of a biaxially stretched polypropylene film having a thickness of 20 μm by a sputtering method, resulting in a vapor-deposited film. The produced vapor-deposited film was subjected to measurements of oxygen transmission rate and peel strength using the same methods as in Example 13. The results are presented in Table 4.

TABLE 4

| | Epoxy Resin Composition | | | | | Evaluations of Gas Barrier Laminate (I) | | | | | | |
|---|---|---|---|---|---|---|---|---|---|---|---|---|
| | | Polyalkylene Glycol | | Unsaturated Fatty Acid Amide | | | | | | | | |
| | No. | Type | Parts by Mass *1) | Type | Parts by Mass *1) | Layer Constitution | Substrate | Inorganic Thin Film Layer | Vapor Deposition Method of Inorganic Thin Film Layer | Thickness of Cured Product Layer μm | Oxygen Transmission Rate (23° C./60% RH) cc/(m$^2$ · day · atm) | Peel Strength g/15 mm |
| Example 11 | Example A | PEG1000 | 1.0 | Erucic Acid Amide | 5.0 | FIG. 2 | OPP | Aluminum | Vacuum Deposition | 0.1 | 3.6 | 125 |
| Reference Example 4 | — | — | — | — | — | — | | | | 0.1 | 20.7 | <50 |
| Example 12 | Example A | PEG1000 | 1.0 | Erucic Acid Amide | 5.0 | FIG. 2 | OPP | Alumina | Vacuum Deposition | 0.1 | 10.4 | 265 |
| Reference Example 5 | — | — | — | — | — | — | | | | 0.1 | 57.5 | <50 |
| Example 13 | Example A | PEG1000 | 1.0 | Erucic Acid Amide | 5.0 | FIG. 2 | OPP | Silica | Sputtering | 0.1 | 4.4 | 265 |
| Reference Example 6 | — | — | — | — | — | — | | | | 0.1 | 18.5 | <50 |

*1) Parts by mass relative to 100 parts by mass of the total amount of the epoxy resin and the nonvolatile content in the epoxy resin curing agent solution Table 4 indicates that, even when used in the gas barrier laminate (I) having the constitution illustrated in FIG. 2, the epoxy resin composition according to an embodiment of the present invention exhibits higher gas barrier properties and adhesiveness than those of the Reference Examples.

INDUSTRIAL APPLICABILITY

The epoxy resin composition according to an embodiment of the present invention can form a curing coating film that is particularly useful as a coating composition, and that has high gas barrier properties, practically sufficient adhesiveness, and a good appearance. The gas barrier laminate including a substrate and a cured product layer of the epoxy resin composition is suitable to be used as various packaging materials.

REFERENCE SIGNS LIST

100, 200, 300, 400 Gas barrier laminate
1 Substrate
2 Inorganic thin film layer
3 Cured product layer
4 Thermoplastic resin film (thermoplastic resin layer)
5 Adhesive layer

The invention claimed is:

1. An epoxy resin composition comprising an epoxy resin, an epoxy resin curing agent containing an amine-based curing agent, and a polyalkylene glycol, and an unsaturated fatty acid amide having from 14 to 24 carbons, wherein a content of the unsaturated fatty acid amide in the epoxy resin composition is from 3.0 to 20.0 parts by mass per 100 parts by mass of a total amount of the epoxy resin and the nonvolatile content in the epoxy resin curing agent.

2. The epoxy resin composition according to claim 1, wherein the amine-based curing agent is an amine-based curing agent (1):

(i) a reaction product of a component (A) and a component (B):

(A) at least one type selected from the group consisting of meta-xylylenediamine and para-xylylenediamine, and (B) at least one type selected from the group consisting of unsaturated carboxylic acids represented by Formula (1) and derivatives thereof;

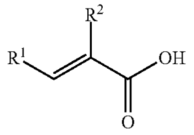

(1)

where $R^1$ and $R^2$ each independently represent a hydrogen atom, an alkyl group having from 1 to 8 carbons, an aryl group having from 6 to 12 carbons, or an aralkyl group having from 7 to 13 carbons.

3. The epoxy resin composition according to claim 1, wherein the polyalkylene glycol has a weight average molecular weight (Mw) of from 200 to 10000.

4. The epoxy resin composition according to claim 2, wherein the unsaturated fatty acid amide is at least one type selected from the group consisting of an oleic acid amide and an erucic acid amide.

5. The epoxy resin composition according to claim 1, wherein a content of the polyalkylene glycol in the epoxy resin composition is from 0.1 to 5.0 parts by mass per 100 parts by mass of a total amount of the epoxy resin and the nonvolatile content in the epoxy resin curing agent.

6. The epoxy resin composition according to claim 1, wherein a ratio of the number of active amine hydrogens in the epoxy resin curing agent to the number of epoxy groups in the epoxy resin is greater than 1.0 and less than or equal to 5.0.

7. The epoxy resin composition according to claim 1, wherein the epoxy resin comprises, as a main component, an epoxy resin having a glycidylamino group derived from meta-xylylenediamine.

8. A gas barrier laminate comprising a substrate and a cured product layer of the epoxy resin composition described in claim 1.

9. The gas barrier laminate according to claim 8, wherein the gas barrier laminate comprises at least one layer composed of an inorganic substance.

10. A packaging material comprising the gas barrier laminate according to claim 8.

* * * * *